(12) United States Patent  (10) Patent No.: US 8,502,849 B2
Ohno  (45) Date of Patent: Aug. 6, 2013

(54) LIGHT-EMITTING DEVICE, PRINT HEAD AND IMAGE FORMING APPARATUS

(75) Inventor: Seiji Ohno, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 530 days.

(21) Appl. No.: 12/773,180

(22) Filed: May 4, 2010

(65) Prior Publication Data

US 2011/0069132 A1    Mar. 24, 2011

(30) Foreign Application Priority Data

Sep. 18, 2009  (JP) ................. 2009-218093

(51) Int. Cl.
*B41J 2/435* (2006.01)
*B41J 27/00* (2006.01)

(52) U.S. Cl.
USPC .......................... 347/224; 347/256

(58) Field of Classification Search
USPC ................... 347/224, 256, 263, 237
See application file for complete search history.

(56) References Cited

U.S. PATENT DOCUMENTS

2005/0231580 A1 * 10/2005 Yamazaki et al. ........... 347/130

FOREIGN PATENT DOCUMENTS

| JP | 2004-181741 | 7/2004 |
| JP | 2005-224958 | 8/2005 |

* cited by examiner

*Primary Examiner* — Uyen Chau N Le
*Assistant Examiner* — Kajli Prince
(74) *Attorney, Agent, or Firm* — Fildes & Outland, P.C.

(57) ABSTRACT

A light-emitting device includes: plural light-emitting elements arrayed in line; and a light-up signal wiring including block wirings that connect the plural light-emitting elements divided into plural blocks being units for controlling turning on and off of the light-emitting elements, that supply electric power for light emission to the light-emitting elements belonging to each of the blocks, and a main wiring that extends from a feeding point and to which the block wirings are connected.

12 Claims, 16 Drawing Sheets

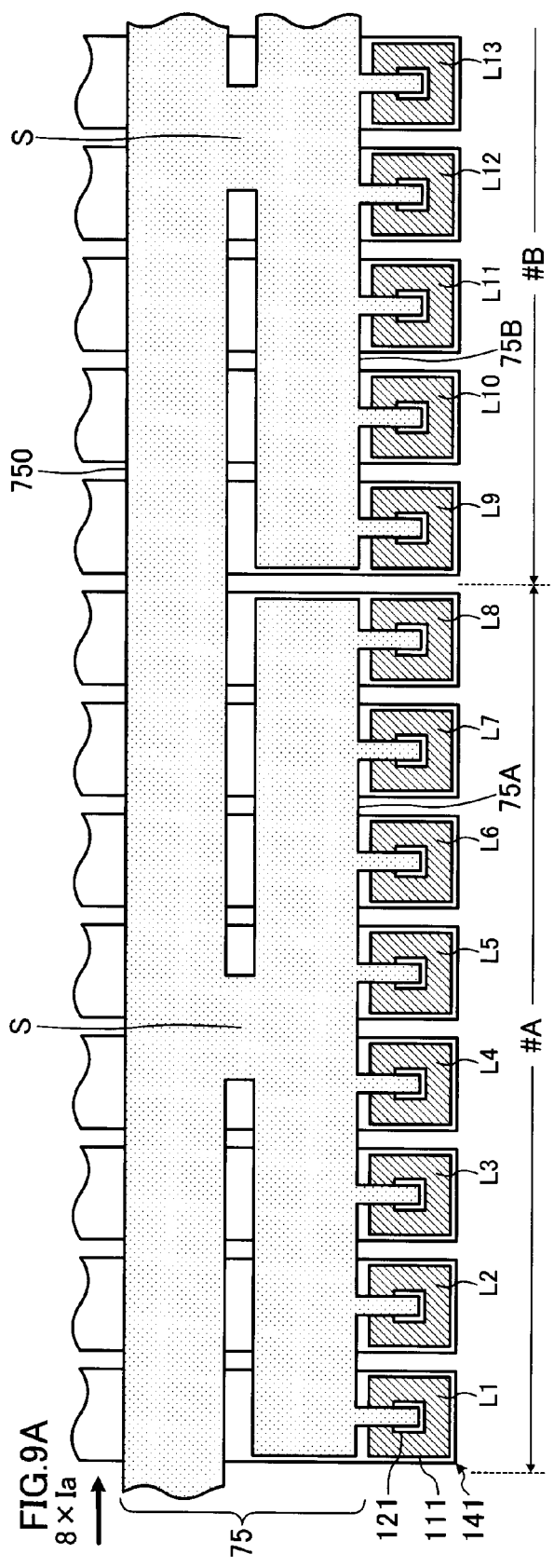
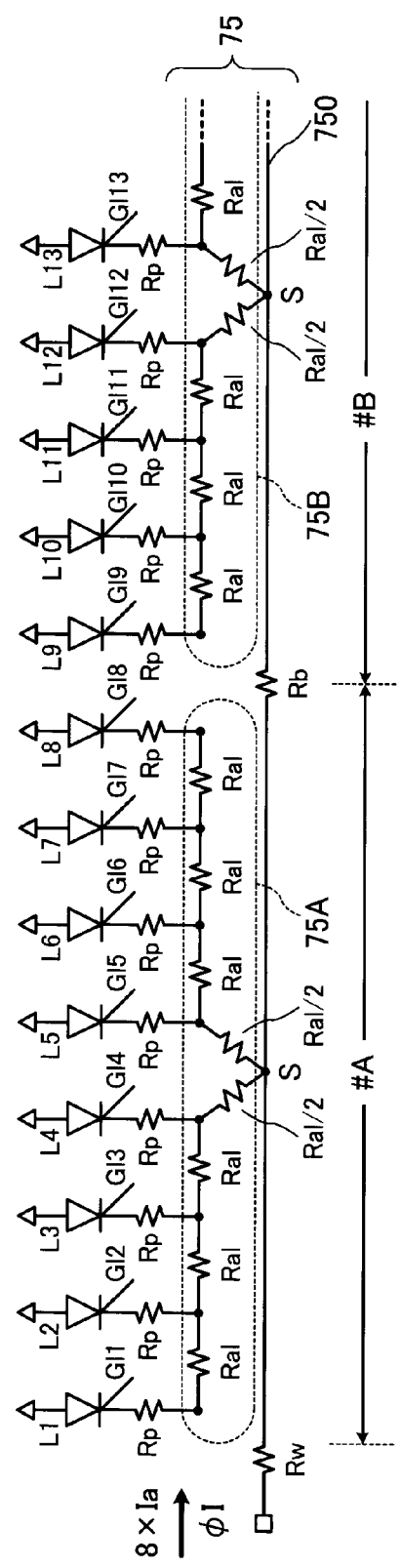
FIG.9A
FIG.9B

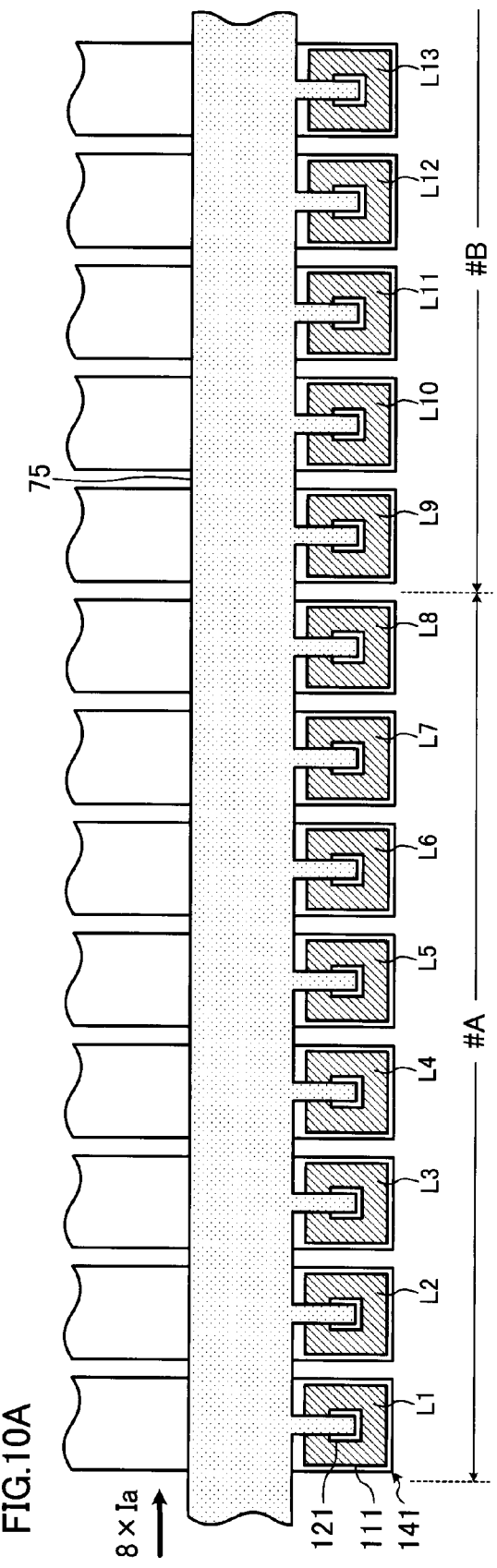
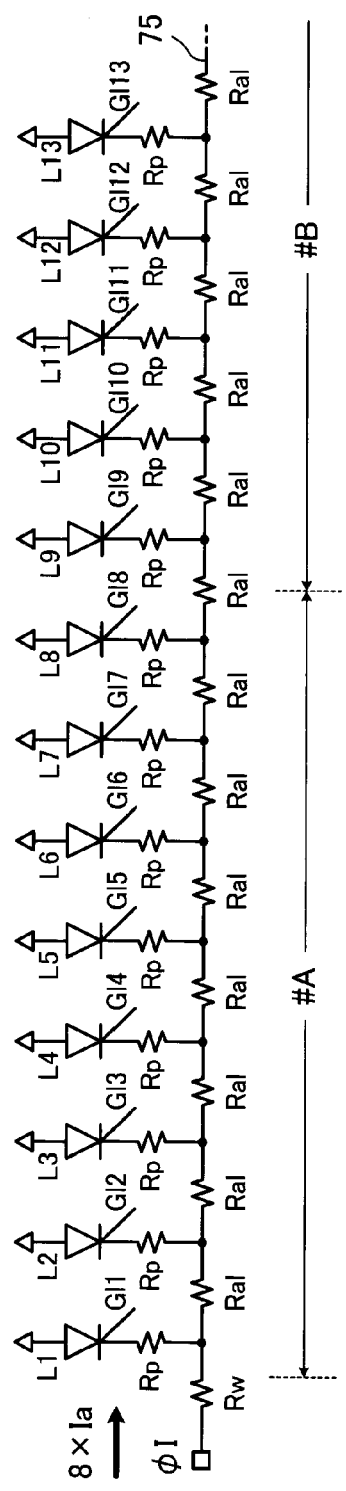
FIG.10A
FIG.10B

US 8,502,849 B2

LIGHT-EMITTING DEVICE, PRINT HEAD AND IMAGE FORMING APPARATUS

CROSS REFERENCE TO RELATED APPLICATIONS

This application is based on and claims priority under 35 USC §119 from Japanese Patent Application No. 2009-218093 filed Sep. 18, 2009.

BACKGROUND

1. Technical Field

The present invention relates to a light-emitting device, a print head and an image forming apparatus.

2. Related Art

In an electrophotographic image forming apparatus such as a printer, a copy machine or a facsimile machine, an image is formed on a recording sheet as follows. Firstly, an electrostatic latent image is formed on a uniformly charged photoconductor by causing an optical recording unit to emit light so as to transfer image information onto the photoconductor. Then, the electrostatic latent image is made visible by being developed with toner. Lastly, the toner image is transferred on and fixed to the recording sheet. In addition to an optical-scanning recording unit that performs exposure by laser scanning in the first scanning direction using a laser beam, a recording device using the following LED print head (LPH) has been employed as such an optical recording unit in recent years in response to demand for downsizing the apparatus. This LPH includes a large number of light-emitting diodes (LEDs), serving as light-emitting elements, arrayed in the first scanning direction.

SUMMARY

According to an aspect of the present invention, there is provided a light-emitting device including: plural light-emitting elements arrayed in line; and a light-up signal wiring including block wirings that connect the plural light-emitting elements divided into plural blocks being units for controlling turning on and off of the light-emitting elements, that supply electric power for light emission to the light-emitting elements belonging to each of the blocks, and a main wiring that extends from a feeding point and to which the block wirings are connected.

BRIEF DESCRIPTION OF THE DRAWINGS

An Exemplary embodiment of the present invention will be described in detail based on the following figures, wherein:

FIG. 9A is a planar layout of the light-up signal line of the first exemplary embodiment;

FIG. 9B is a diagram illustrating an equivalent circuit of the light-up signal line shown in FIG. 9A;

FIG. 10A is a planar layout of the light-up signal line in a case where the first exemplary embodiment is not employed;

FIG. 10B is a diagram illustrating an equivalent circuit of the light-up signal line shown in FIG. 10A;

DETAILED DESCRIPTION

First Exemplary Embodiment

Hereinafter, a description will be given of an exemplary embodiment of the present invention in detail with reference to the accompanying drawings.

(Image Forming Apparatus)

Figure 1:
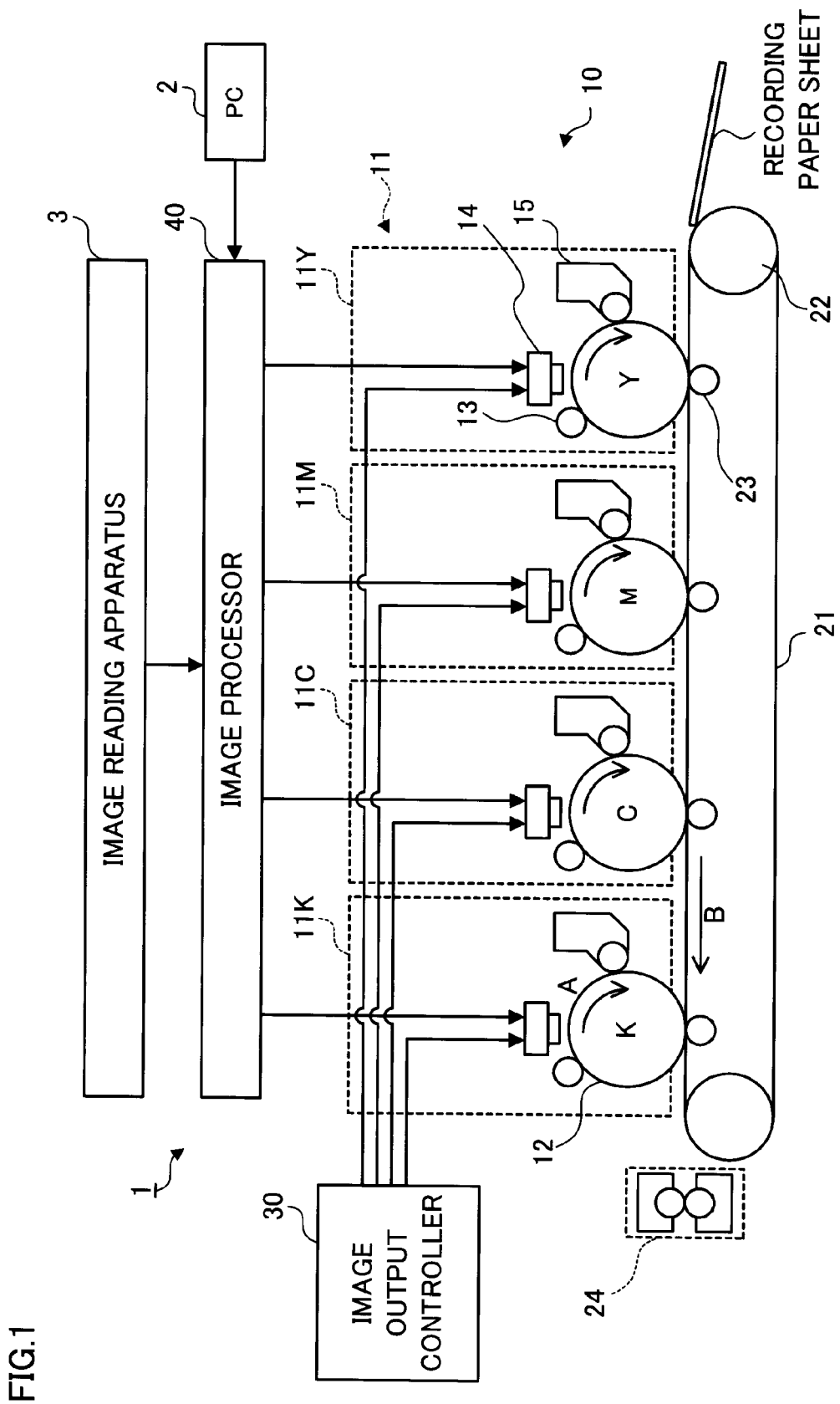
FIG. 1 is a diagram for explaining an example of an overall configuration of an image forming apparatus to which the first exemplary embodiment is applied.

FIG. 1 is a diagram for explaining an example of an overall configuration of an image forming apparatus 1 to which the first exemplary embodiment is applied. The image forming apparatus 1 shown in FIG. 1 is what is generally termed as a tandem image forming apparatus. The image forming apparatus 1 includes an image forming process unit 10, an image output controller 30 and an image processor 40. The image forming process unit 10 forms an image in accordance with different color image data. The image output controller 30 controls the image forming process unit 10. The image processor 40, which is connected to devices such as a personal computer (PC) 2 and an image reading apparatus 3, performs predefined image processing on image data received from the above devices.

The image forming process unit 10 includes image forming units 11 formed of plural engines arranged in parallel at regular intervals. The image forming units 11 are formed of four image forming units 11Y, 11M, 11C and 11K. Each of the image forming units 11Y, 11M, 11C and 11K includes a photoconductive drum 12, a charging device 13, a print head 14 and a developing device 15. On the photoconductive drum 12, which is an example of an image carrier, an electrostatic latent image is formed, and the photoconductive drum 12 retains a toner image. The charging device 13, as an example of a charging unit, uniformly charges the surface of the photoconductive drum 12 at a predetermined potential. The print head 14 exposes the photoconductive drum 12 charged by the charging device 13. The developing device 15, as an example of a developing unit, develops an electrostatic latent image formed by the print head 14. Here, the image forming units 11Y, 11M, 11C and 11K have approximately the same configuration excluding colors of toner put in the developing devices 15. The image forming units 11Y, 11M, 11C and 11K form yellow (Y), magenta (M), cyan (C) and black (K) toner images, respectively.

In addition, the image forming process unit 10 further includes a sheet transport belt 21, a drive roll 22, transfer rolls 23 and a fixing device 24. The sheet transport belt 21 transports a recording sheet as a transferred body so that different color toner images respectively formed on the photoconductive drums 12 of the image forming units 11Y, 11M, 11C and 11K are transferred on the recording sheet by multilayer transfer. The drive roll 22 is a roll that drives the sheet transport belt 21. Each transfer roll 23, as an example of a transfer unit, transfers a toner image formed on the corresponding photoconductive drum 12 onto the recording sheet. The fixing device 24 fixes the toner images on the recording sheet.

In this image forming apparatus 1, the image forming process unit 10 performs an image forming operation on the basis of various kinds of control signals supplied from the image output controller 30. Under the control by the image output controller 30, the image data received from the personal computer (PC) 2 or the image reading apparatus 3 is subjected to image processing by the image processor 40, and then the resultant data is supplied to the corresponding image forming unit 11. Then, for example in the black (K) color image forming unit 11K, the photoconductive drum 12 is charged at a predetermined potential by the charging device 13 while rotating in an arrow A direction, and then is exposed by the print head 14 emitting light on the basis of the image data supplied from the image processor 40. By this operation, the electrostatic latent image for the black (K) color image is formed on the photoconductive drum 12. Thereafter, the electrostatic latent image formed on the photoconductive drum 12 is developed by the developing device 15, and accordingly the black (K) color toner image is formed on the photoconductive drum 12. Similarly, yellow (Y), magenta (M) and cyan (C) color toner images are formed in the image forming units 11Y, 11M and 11C, respectively.

The respective color toner images on the photoconductive drums 12, which are formed in the respective image forming units 11, are electrostatically transferred to the recording sheet supplied with the movement of the sheet transport belt 21 by a transfer electric field applied to the transfer rolls 23, in sequence. Here, the sheet transport belt 21 moves in an arrow B direction. By this operation, a synthetic toner image, which is superimposed color-toner images, is formed on the recording sheet.

Thereafter, the recording sheet on which the synthetic toner image is electrostatically transferred is transported to the fixing device 24. The synthetic toner image on the recording sheet transported to the fixing device 24 is fixed on the recording sheet through fixing processing using heat and pressure by the fixing device 24, and then is outputted from the image forming apparatus 1.

(Print Head)

Figure 2:
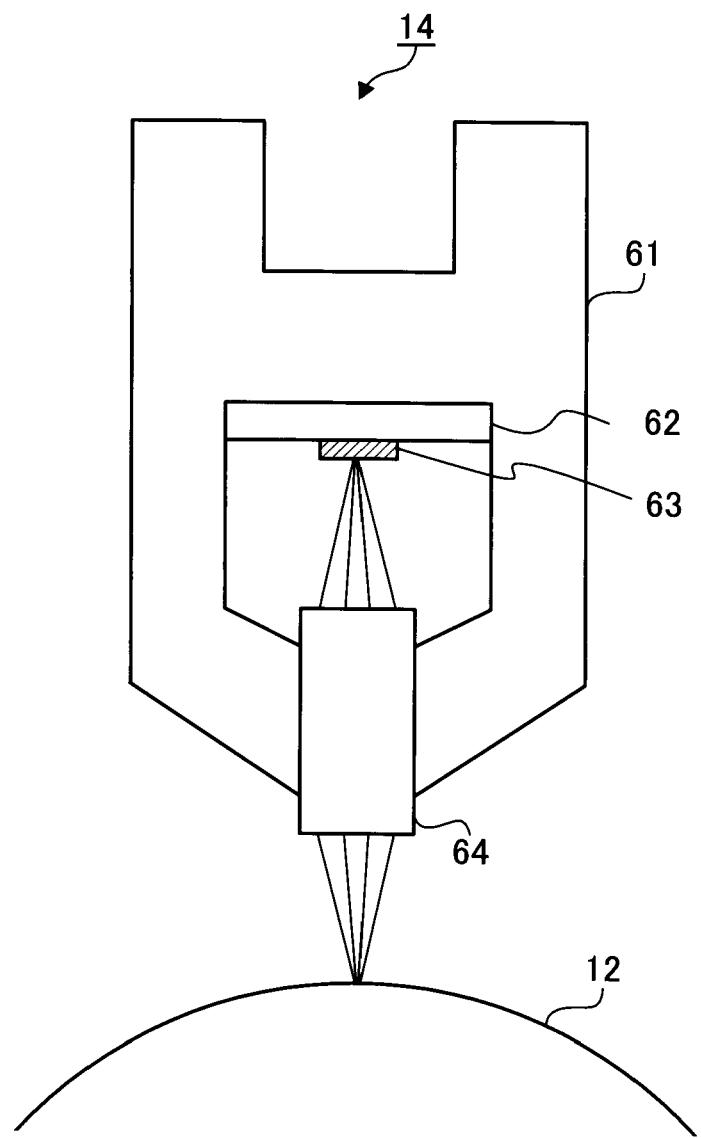
FIG. 2 is a view for explaining a structure of the print head to which the first exemplary embodiment is applied.

FIG. 2 is a view for explaining a structure of the print head 14 to which the first exemplary embodiment is applied. The print head 14 includes a housing 61, a light-emitting portion 63, a circuit board 62 as an example of an exposure unit, and a rod lens array 64. The light-emitting portion 63 has plural LEDs (which are light-emitting thyristors in the present exemplary embodiment). On the circuit board 62, the light-emitting portion 63, a signal generating circuit 100 (see FIG. 3 to be described later) that drives the light-emitting portion 63, and the like are mounted. The rod lens array 64, as an example of an optical unit, focuses light emitted by the light-emitting portion 63 onto the surface of the photoconductive drum 12.

The housing 61 is made of metal, for example, and supports the circuit board 62 and the rod lens array 64. The housing 61 is set so that the light-emitting points of the light-emitting portions 63 are located on the focal plane of the rod lens array 64. In addition, the rod lens array 64 is arranged along an axial direction of the photoconductive drum 12 (the first scanning direction).

(Circuit Board and Light-Emitting Portion)

Figure 3:
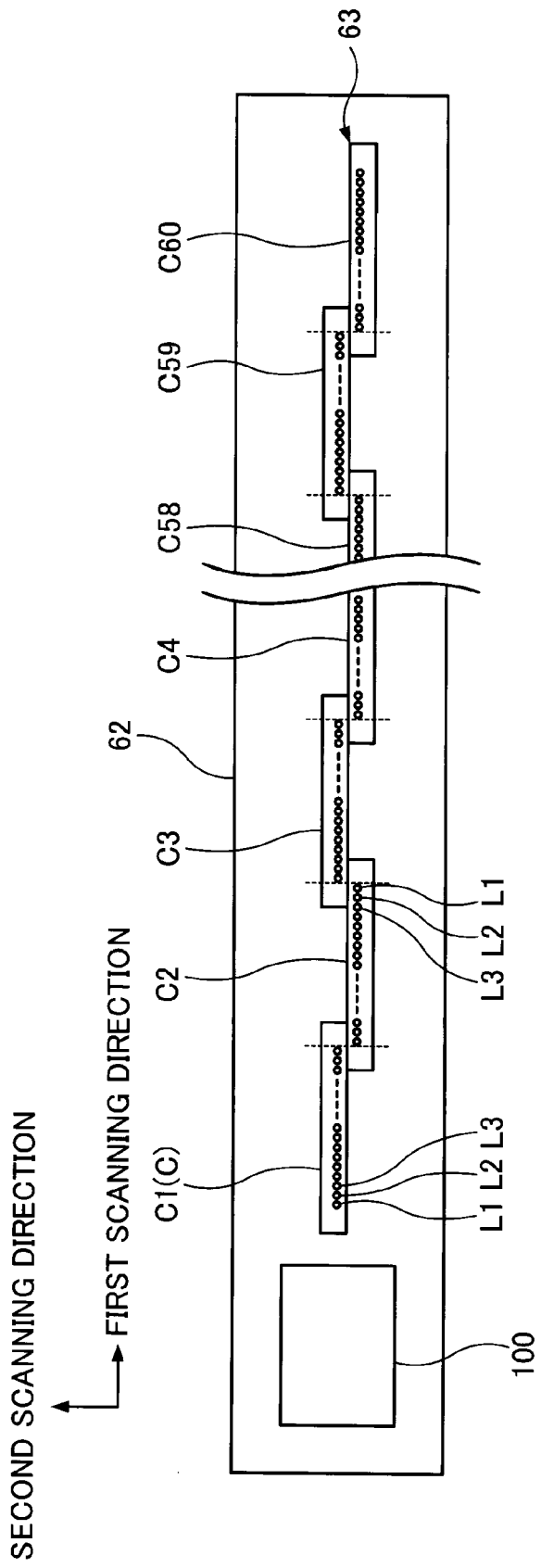
FIG. 3 is a top view of the circuit board and the light-emitting portion in the print head.

FIG. 3 is a top view of the circuit board 62 and the light-emitting portion 63 in the print head 14.

As shown in FIG. 3, the light-emitting portion 63 is formed of sixty light-emitting chips C1 to C60, each of which is an example of a light-emitting device, arranged in two lines in the first scanning direction on the circuit board 62. Here, the sixty light-emitting chips C1 to C60 are arrayed in a zigzag pattern in which each adjacent two of the light-emitting chips C1 to C60 face each other. Note that, if the light-emitting chips C1 to C60 are not distinguished, they are described as light-emitting chips C (C1 to C60) or light-emitting chips C. The same is true for the other terms.

All of the light-emitting chips C (C1 to C60) have the same configuration. As described later, each of the light-emitting chips C (C1 to C60) has a light-emitting thyristor array (light-emitting element array) formed of light-emitting thyristors L1, L2, L3 . . . , which are an example of light-emitting elements. The light-emitting thyristor array is arranged along long sides of the rectangular of the light-emitting chips C. The light-emitting thyristor array is arranged so as to come close to one of the long sides and so as to have the light-emitting thyristors L1, L2, L3 . . . at regular intervals.

Note that, if the light-emitting thyristors L1, L2, L3 . . . are not distinguished, they are called light-emitting thyristors L. The same is true for the other terms.

On the circuit board 62, odd-numbered light-emitting chips C1, C3, C5 . . . and even-numbered light-emitting chips C2, C4, C6 . . . are arranged so as to face each other. The light-emitting chips C1 to C60 are arranged so that the light-emitting thyristors L are arranged at regular intervals in the first scanning direction also in connecting portions of the light-emitting chips C that are shown as dashed lines.

Further, the circuit board 62 includes the signal generating circuit 100 that drives the light-emitting portion 63, as described above.

Figure 4:
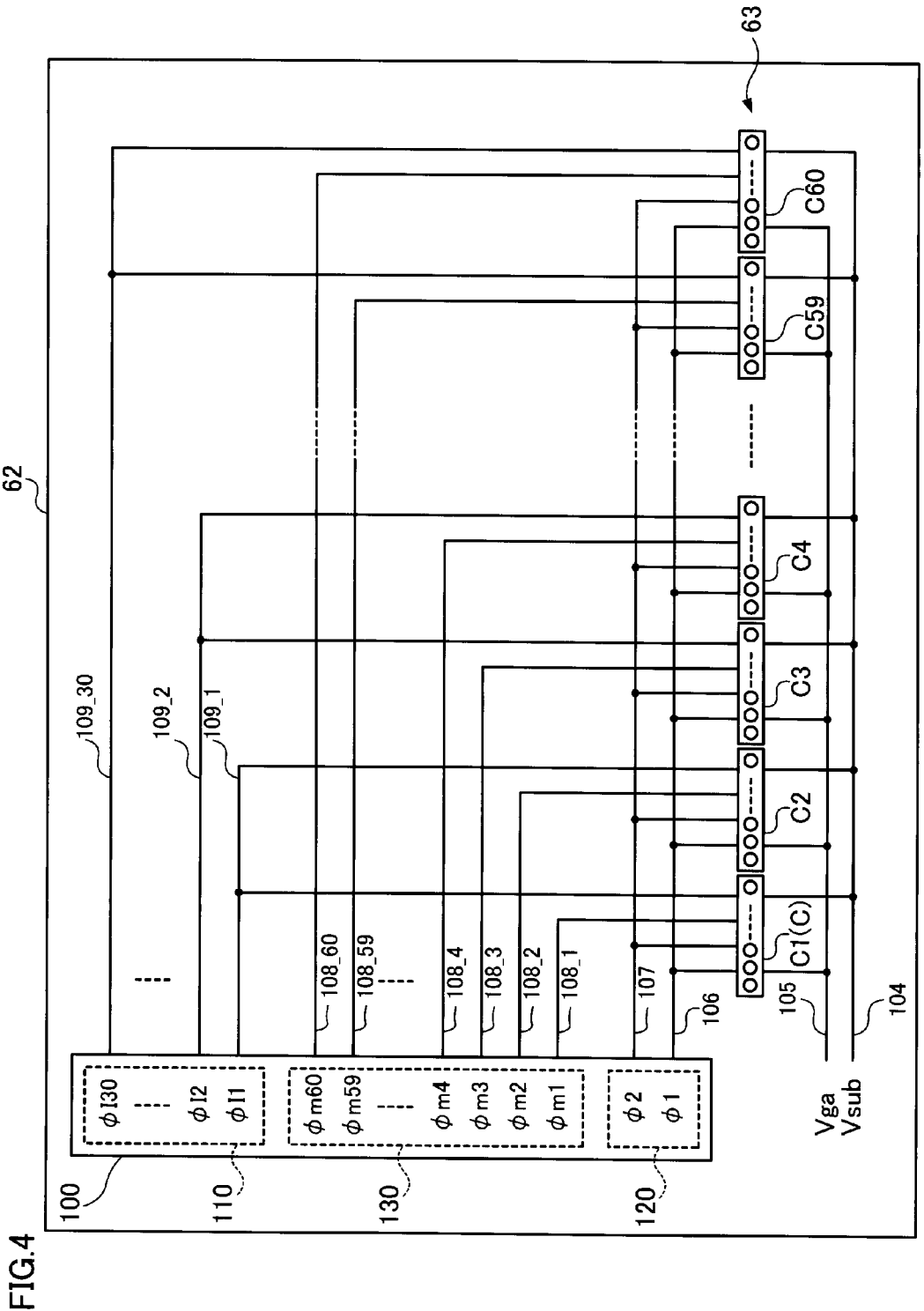
FIG. 4 is a diagram for explaining a configuration of the signal generating circuit mounted on the circuit board and a wiring configuration of the signal generating circuit and the light-emitting chips.

FIG. 4 is a diagram for explaining a configuration of the signal generating circuit 100 mounted on the circuit board 62 (see FIG. 2) and a wiring configuration of the signal generating circuit 100 and the light-emitting chips C (C1 to C60). Note that, in FIG. 4, since a description will be given of the wiring configuration, illustration of the zigzag pattern of the light-emitting chips C1 to C60 is omitted.

To the signal generating circuit 100, image data subjected to the image processing and various kinds of control signals are inputted from the image output controller 30 and the image processor 40 (see FIG. 1), although the illustration thereof is omitted. Then, the signal generating circuit 100 performs rearrangement of the image data, correction of intensity of the light emission and the like on the basis of the image data and the various kinds of control signals.

The signal generating circuit 100 includes a light-up signal generating unit 110, as an example of a light-up signal supplying unit, that transmits, to the light-emitting chips C (C1 to C60), light-up signals φI (φI1 to φI30) for supplying electric power for light emission to the light-emitting thyristors L.

The signal generating circuit 100 includes a transfer signal generating unit 120 that transmits, to the light-emitting chips C1 to C60, a first transfer signal φ1 and a second transfer signal φ2 on the basis of the various kinds of control signals. Further, the signal generating circuit 100 includes a memory signal generating unit 130 that transmits memory signals φm (φm1 to φm60) that designate the light-emitting thyristors L to be caused to light up, on the basis of the image data.

A power supply line 104 is provided to the circuit board 62. The power supply line 104 is connected to Vsub terminals (see FIG. 5 to be described later) of the light-emitting chips C (C1 to C60), and supplies a reference potential Vsub (for example, 0 V). In addition, another power supply line 105 is provided to the circuit board 62. The power supply line 105 is connected to Vga terminals (see FIG. 5 to be described later) of the light-emitting chips (C1 to C60), and supplies a power supply potential Vga for power supply (for example, −3.3 V).

Moreover, a first transfer signal line 106 and a second transfer signal line 107 are provided to the circuit board 62. The first transfer signal line 106 and the second transfer signal line 107 respectively transmit the first transfer signal φ1 and the second transfer signal φ2 from the transfer signal generating unit 120 of the signal generating circuit 100 to the light-emitting portion 63. The first transfer signal line 106 and the second transfer signal line 107 are parallely connected to φ1 terminals and φ2 terminals (see FIG. 5 to be described later) of the light-emitting chips C (C1 to C60), respectively.

Further, sixty memory signal lines 108 (108_1 to 108_60) are provided to the circuit board 62. The memory signal lines 108 transmit the respective memory signals φm (φm1 to φm60) from the memory signal generating unit 130 of the signal generating circuit 100 to the corresponding light-emitting chips C (C1 to C60). The memory signal lines 108_1 to 108_60 are respectively connected to φm terminals (see FIG. 5 to be described later) of the light-emitting chips C1 to C60. That is, the memory signals φm (φm1 to φm60) are individually transmitted to the light-emitting chips C (C1 to C60).

Furthermore, thirty light-up signal lines 109 (109_1 to 109_30) are also provided to the circuit board 62. The light-up signal lines 109 transmit the respective light-up signals φI (φI1 to φI30) from the light-up signal generating unit 110 of the signal generating circuit 100 to the corresponding light-emitting chips C (C1 to C60). Each of the light-up signal lines 109 (109_1 to 109_30) is connected to corresponding φI terminals (see FIG. 5 to be described later), which are feeding points to supply electric power for light emission to the light-emitting chips, with two light-emitting chips C as a pair. For example, the light-up signal line 109_1 is parallely connected to the φI terminals of the light-emitting chips C1 and C2, and the light-up signal φI1 is sharably supplied thereto. Similarly, the light-up signal line 109_2 is parallely connected to the φI terminals of the light-emitting chips C3 and C4, and the light-up signal φI2 is sharably supplied thereto. The others have the similar configuration. Thus, the number (30) of the light-up signals φI is half of the number (60) of the light-emitting chips C.

As described above, in the first exemplary embodiment, the first transfer signal φ1 and the second transfer signal φ2 are sharably transmitted to all of the light-emitting chips C (C1 to C60). The memory signals φm (φm1 to φm60) are individually transmitted to the light-emitting chips C (C1 to C60). Each of the light-up signals φI (φI1 to φI30) is sharably transmitted to the corresponding two of the light-emitting chips C (C1 to C60).

By this configuration, the number of the light-up signal lines 109 (109_1 to 109_30) is set smaller than the number of the light-emitting chips C (C1 to C60).

The light-up signal lines 109 are required to have a low resistance in order to supply a current for lighting-up (light emission) to the light-emitting thyristors L. For this reason, if the light-up signal lines 109 are configured of wide wirings, the width of the circuit board 62 becomes larger, which prevents downsizing of the print head 14. On the other hand, if the signal lines are configured to have plural layers in order to make the width of the circuit board 62 narrower, this configuration prevents cost reduction of the print head 14.

In the first exemplary embodiment, the number of the light-up signal lines 109 is reduced by half in comparison with a case where the light-up signal lines 109 are individually provided for the light-emitting chips C, and thus the print head 14 may be downsized and produced at low cost.

(Equivalent Circuit of Light-Emitting Chips)

Figure 5:
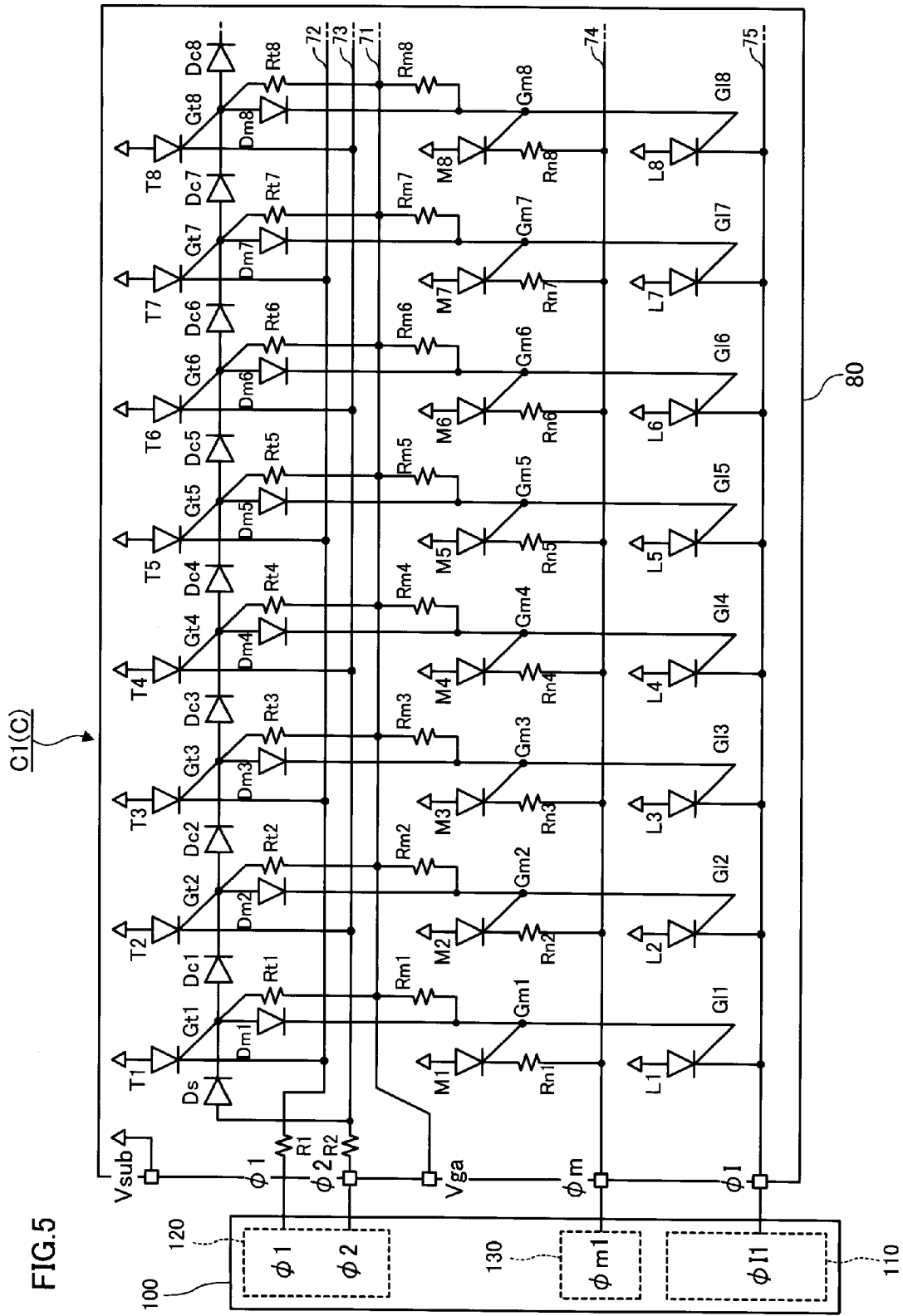
FIG. 5 is a diagram for explaining an equivalent circuit of the light-emitting chips as the self-scanning light-emitting element array (SLED) chips.

FIG. 5 is a diagram for explaining an equivalent circuit of the light-emitting chips C (C1 to C60) as the self-scanning light-emitting element array (SLED) chips. A description will be given of the light-emitting chip C1 as an example, since the light-emitting chips C (C1 to C60) have the same configuration. Here, a notation of the light-emitting chip C1 (C) will be used to indicate that the other light-emitting chips C2 to C60 have the same configuration as the light-emitting chip C1.

The light-emitting chip C1 (C) includes a transfer thyristor array formed of the transfer thyristors T1, T2, T3 . . . arrayed in line, a memory thyristor array formed of the memory thyristors M1, M2, M3 . . . similarly arrayed in line, and a light-emitting thyristor array formed of the light-emitting thyristors L1, L2, L3 . . . similarly arrayed in line, which are provided on a substrate 80.

Note that, the transfer thyristors T, memory thyristors M and light-emitting thyristors L are semiconductor elements each having three terminals, that is, an anode terminal (anode), a cathode terminal (cathode) and a gate terminal (gate).

The light-emitting chip C1 (C) includes coupling diodes Dc1, Dc2, Dc3 . . . connecting respective pairs that are each formed of two of the transfer thyristors T1, T2, T3 . . . and that are formed in numerical order. Moreover, the light-emitting chip C1 (C) includes connecting diodes Dm1, Dm2, Dm3 . . . .

In addition, the light-emitting chip C1 (C) includes power supply line resistances Rt1, Rt2, Rt3 . . . , power supply line resistances Rm1, Rm2, Rm3 . . . , and resistances Rn1, Rn2, Rn3 . . . .

Furthermore, the light-emitting chip C1 (C) includes one start diode Ds. The light-emitting chip C1 (C) includes current limitation resistances R1 and R2 in order to prevent an excessive current from flowing into a first transfer signal line 72 and a second transfer signal line 73.

Note that, in the first exemplary embodiment, if the number of the light-emitting thyristors L in the light-emitting thyristor array is set at 128, the respective numbers of the transfer thyristors T and the memory thyristors M are also set at 128. Similarly, the respective numbers of the connecting diodes Dm, the power supply line resistances Rt and Rm, and the resistances Rn are 128. Meanwhile, the number of the coupling diodes Dc is 127, which is less by 1 than the number of the transfer thyristors T.

These elements are respectively arrayed in numerical order from the left side of FIG. 5, such as 1, 2, 3 . . . .

In FIG. 5, only a part mainly including the transfer thyristors T1 to T8, the memory thyristors M1 to M8 and the light-emitting thyristors L1 to L8 is shown. The other part is a repeat of the above part.

Note that, the respective numbers of the transfer thyristors T and the memory thyristors M are not necessarily the same as the number of the light-emitting thyristors L, and they may be larger than the number of the light-emitting thyristors L.

Next, a description will be given of electric connections between the elements in the light-emitting chip C1 (C).

Anode terminals of the transfer thyristors T, anode terminals of the memory thyristors M and anode terminals of the light-emitting thyristors L are connected to the substrate 80 of the light-emitting chip C1 (anode common). These anode terminals are connected to the power supply line 104 (see FIG. 4) through the Vsub terminals (back-side common electrodes) provided to the substrate 80. To this power supply line 104, the reference potential Vsub is supplied.

Gate terminals Gt of the transfer thyristors T are connected to a power supply line 71 through the respective power supply line resistances Rt which are provided so as to correspond to the respective transfer thyristors T. The power supply line 71 is connected to the Vga terminal. The Vga terminal is connected to the power supply line 105 (see FIG. 4), and the power supply potential Vga is supplied thereto.

Cathode terminals of the odd-numbered transfer thyristors T1, T3, T5 . . . are connected to the first transfer signal line 72 along with the array of the transfer thyristors T. The first transfer signal line 72 is connected to the φ1 terminal that is an input terminal of the first transfer signal φ1, through the current limitation resistance R1. To this φ1 terminal, the first transfer signal line 106 (see FIG. 4) is connected, and the first transfer signal φ1 is supplied thereto.

Meanwhile, cathode terminals of the even-numbered transfer thyristors T2, T4, T6 . . . are connected to the second transfer signal line 73 along with the array of the transfer thyristors T. The second transfer signal line 73 is connected to the φ2 terminal that is an input terminal of the second transfer signal φ2, through the current limitation resistance R2. To this φ2 terminal, the second transfer signal line 107 (see FIG. 4) is connected, and the second transfer signal φ2 is supplied thereto.

Gate terminals Gm of the memory thyristors M are connected to the power supply line 71 through the respective power supply line resistances Rm.

Cathode terminals of the memory thyristors M are connected to the memory signal line 74 through the corresponding resistances Rn. The memory signal line 74 is connected to the φm terminal that is an input terminal of the memory signal φm (φm1 in the case of the light-emitting chip C1). To the φm terminal, the memory signal line 108 (see FIG. 4: the memory signal line 108_1 in the case of the light-emitting chip C1) is connected, and the memory signal φm (see FIG. 4: the memory signal φm1 in the case of the light-emitting chip C1) is supplied thereto.

Cathode terminals of the light-emitting thyristors L are connected to a light-up signal line (also referred to as light-up signal wiring) 75. The light-up signal line 75 is connected to the φI terminal that is an input terminal of the light-up signal φI (the light-up signal φI1 in the case of the light-emitting chip C1). To the φI terminal, the light-up signal line 109 (see FIG. 4: the light-up signal line 109_1 in the case of the light-emitting chip C1) is connected, and the light-up signal φI (see FIG. 4: the light-up signal φI1 in the case of the light-emitting chip C1) is supplied thereto.

Each of the gate terminals Gt of the transfer thyristors T is connected to corresponding one of the gate terminals Gm of the memory thyristors M, which has the same number as the gate terminal Gt to be connected thereto, through corresponding one of the connecting diodes Dm, with a one-to-one relationship. In other words, the anode terminals of the connecting diodes Dm are respectively connected to the gate terminals Gt of the transfer thyristors T, and the cathode terminals of the connecting diodes Dm are respectively connected to the gate terminals Gm of the memory thyristors M.

Further, each of the gate terminals Gm of the memory thyristors M is connected to corresponding one of gate terminals Gl of the light-emitting thyristors L, which has the same number as the gate terminal Gm to be connected thereto, with a one-to-one relationship.

Each of the coupling diodes Dc is connected between a corresponding pair of the gate terminals Gt of the transfer thyristors T. Each of the pairs is formed of two gate terminals Gt among the gate terminals Gt1, Gt2, Gt3 . . . of the transfer thyristors T1, T2, T3 . . . and is formed in numerical order. In other words, each of the coupling diodes Dc is serially connected to the corresponding two of the gate terminals Gt. The coupling diode Dc1 is connected thereto so that a direction thereof is equivalent to a direction of the current flowing from the gate terminal Gt1 to the gate terminal Gt2. The same configuration is applied to the other coupling diodes Dc2, Dc3, Dc4 . . . .

The gate terminal Gt1 of the transfer thyristor T1, which is positioned on one end side of the transfer thyristor array, is connected to the cathode terminal of the start diode Ds. On the other hand, an anode terminal of the start diode Ds is connected to the second transfer signal line 73.

(Planar Layout and Cross Section of Light-Emitting Chip)

Figure 6:
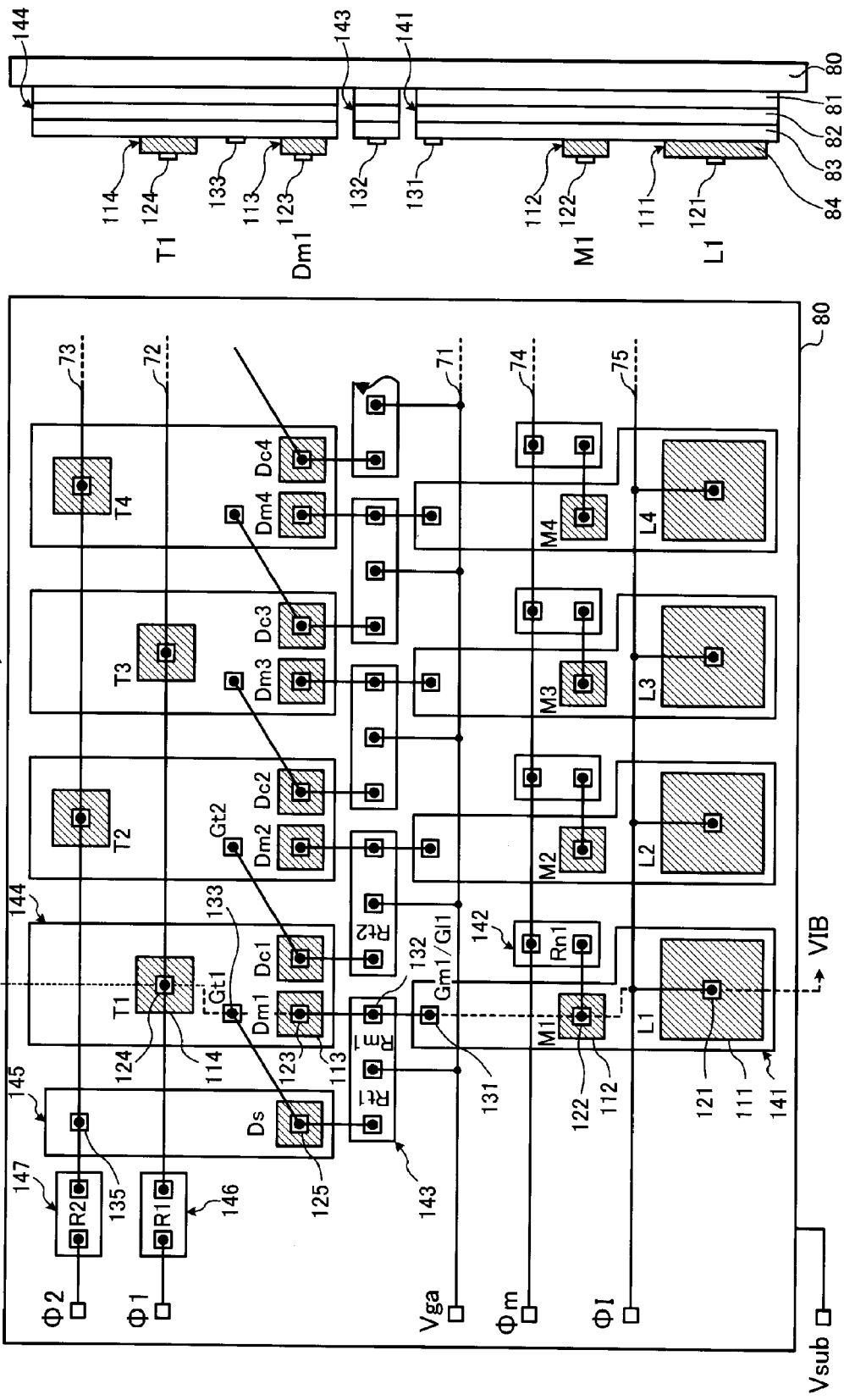
FIG. 6A is a planar layout of the light-emitting chip.
FIG. 6B is a cross-sectional view of FIG. 6A.

FIG. 6A is a planar layout of a part mainly including the transfer thyristors T1 to T4, the memory thyristors M1 to M4 and the light-emitting thyristors L1 to L4 of the light-emitting chip C1 (C). FIG. 6B is a cross-sectional view of FIG. 6A, taken along a line VIB-VIB. Specifically, FIG. 6B mainly shows cross sections of the transfer thyristor T1, the connecting diode Dm1, the memory thyristor M1 and the light-emitting thyristor L1. Note that, in FIGS. 6A and 6B, a part of elements and terminals are shown by using the above-mentioned names. Hereinafter, a description will sometimes be given without reference numerals.

As shown in FIG. 6B, the light-emitting chip C1 (C) is made of a compound semiconductor such as GaAs or GaAlAs, for example, and is configured by stacking a first p-type semiconductor layer 81, a second n-type semiconductor layer 82, a third p-type semiconductor layer 83 and a fourth n-type semiconductor layer 84 in sequence on the substrate 80 as a p-type semiconductor.

Further, plural islands (a first island 141 to an seventh island 147 and the like) are formed by sequentially etching the first p-type semiconductor layer 81, the second n-type semiconductor layer 82, the third p-type semiconductor layer 83 and the fourth n-type semiconductor layer 84.

Note that, in FIGS. 6A and 6B, insulating layers formed on each island and openings provided to the insulating layer are omitted. Further, in FIG. 6A, wirings (wirings formed of aluminum (Al), aluminum alloy (Al alloy) or the like) provided on the insulating layers and connecting each terminal of elements are shown as solid lines. Furthermore, in FIG. 6B, illustration of the wirings is omitted.

As shown in FIG. 6A, the light-emitting thyristor L1 and the memory thyristor M1 are formed in the first island 141, the resistance Rn1 is formed in a second island 142, the power supply line resistances Rt1 and Rm1 are formed in a third island 143, and the coupling diode Dc 1, the connecting diode Dm1 and the transfer thyristor T1 are formed in a fourth island 144. Furthermore, islands similar to the first island 141 to the fourth island 144 are formed in parallel on the substrate 80. In these islands, the light-emitting thyristors L2, L3, L4 . . . , the memory thyristors M2, M3, M4 . . . , the transfer thyristors T2, T3, T4 . . . and the like are formed. A description thereof will be omitted.

Meanwhile, the start diode Ds is formed in a fifth island 145, the current limitation resistance R1 is formed in a sixth island 146, and the current limitation resistance R2 is formed in the seventh island 147. On the back surface of the substrate 80, back-side common electrodes as the Vsub terminals are formed.

As shown in FIG. 6B, the light-emitting thyristor L1 formed in the first island 141 has the substrate 80 set as the anode terminal, an n-type ohmic electrode 121 set as the cathode terminal, and a p-type ohmic electrode 131 set as the gate terminal Gl1. Here, the n-type ohmic electrode 121 is formed in a region 111 of the fourth n-type semiconductor layer 84, while the p-type ohmic electrode 131 is formed on the third p-type semiconductor layer 83 exposed by removing the fourth n-type semiconductor layer 84 by etching. The surface of the region 111 of the fourth n-type semiconductor layer 84 except a portion on which the n-type ohmic electrode 121 is formed emits light, when the light-emitting thyristor L1 is in an ON state.

Furthermore, the memory thyristor M1 formed in the first island 141 includes the substrate 80 set as an anode terminal, an n-type ohmic electrode 122 set as a cathode terminal, and the p-type ohmic electrode 131 set as the gate terminal Gm1. Here, the n-type ohmic electrode 122 is formed in a region 112 of the fourth n-type semiconductor layer 84. Note that, the p-type ohmic electrode 131 is common to the gate terminal Gl1 of the light-emitting thyristor L1.

Although not shown in FIG. 6B, the resistance Rn1 formed in the second island 142 is formed between two p-type ohmic electrodes (no reference numerals) formed on the third p-type semiconductor layer 83 exposed by removing the fourth n-type semiconductor layer 84 by etching. The resistance Rn1 includes the third p-type semiconductor layer 83 as a resistive layer.

The power supply line resistances Rt1 and Rm1 formed in the third island 143 sharably have p-type ohmic electrode formed on the third p-type semiconductor layer 83 and located at the center thereof, and are formed, similarly to the resistance Rn1, between two p-type ohmic electrodes (one is a p-type ohmic electrode 132, while the other has no reference numeral.) that sandwich the above-mentioned p-type ohmic electrode. The power supply line resistances Rt1 and Rm1 include the third p-type semiconductor layer 83 as a resistive layer.

As shown in FIG. 6B, the transfer thyristor T1 formed in the fourth island 144 includes the substrate 80 set as the anode terminal, an n-type ohmic electrode 124 set as the cathode terminal, and a p-type ohmic electrode 133 set as the gate terminal Gt1. Here, the n-type ohmic electrode 124 is formed in a region 114 of the fourth n-type semiconductor layer 84, while the p-type ohmic electrode 133 is formed on the third p-type semiconductor layer 83 exposed by removing the fourth n-type semiconductor layer 84 by etching.

Similarly, the connecting diode Dm1 formed in the fourth island 144 includes an n-type ohmic electrode 123, which is set as a cathode terminal, in a region 113 of the fourth n-type semiconductor layer 84, and the p-type ohmic electrode 133, which is set as an anode terminal, on the third p-type semiconductor layer 83.

The coupling diode Dc1 is formed similarly to the connecting diode Dm1, although the illustration thereof is not shown in FIG. 6B.

The start diode Ds formed in the fifth island 145 includes an n-type ohmic electrode 125, which is set as a cathode terminal, provided on the fourth n-type semiconductor layer 84, and a p-type ohmic electrode 135, which is set as an anode terminal, on the third p-type semiconductor layer 83 exposed by removing the fourth n-type semiconductor layer 84.

The current limitation resistance R1 formed in the sixth island 146 and the current limitation resistance R2 formed in the seventh island 147 are configured similarly to the resistance Rn1 formed in the second island 142 and the power supply line resistance Rt1 and Rm1 formed in the third island 143. The current limitation resistances R1 and R2 include the third p-type semiconductor layer 83 set as a resistive layer.

A description will be given of connecting relationships between the elements in FIG. 6A. In FIG. 6A, the wirings connecting each terminal of the elements provided on the insulating layers are shown as solid lines.

The n-type ohmic electrode 121 that is the cathode terminal of the light-emitting thyristor L1 provided in the first island 141 is connected to the light-up signal line 75. The light-up signal line 75 is connected to the φI terminal.

The n-type ohmic electrode 122 that is the cathode terminal of the memory thyristor M1 provided in the first island 141 is connected to one terminal of the resistance Rn1 in the second island 142. The other terminal of the resistance Rn1 is connected to the memory signal line 74. The memory signal line 74 is connected to the φm terminal.

The p-type ohmic electrode 131 that is the gate terminal Gl1 of the light-emitting thyristor L1 and the gate terminal Gm1 of the memory thyristor M1 is connected to the p-type ohmic electrode 132 that is one terminal of the power supply line resistance Rm1 in the third island 143. The other terminal of the power supply line resistance Rm1 is connected to the power supply line 71. The power supply line 71 is connected to the Vga terminal.

Furthermore, the p-type ohmic electrode 132 is connected to the n-type ohmic electrode 123 that is the cathode terminal of the connecting diode Dm1 in the fourth island 144.

In the fourth island 144, the p-type ohmic electrode 133 that is the gate terminal Gt1 of the transfer thyristor T1, the anode terminal of the connecting diode Dm1 and the anode terminal of the coupling diode Dc1 is connected to the n-type ohmic electrode 125 that is the cathode terminal of the start diode Ds in the fifth island 145.

The n-type ohmic electrode 125 is connected to one terminal of the power supply line resistance Rt1 provided in the third island 143. The other terminal of the power supply line resistance Rt1 is common to the other terminal of the power supply line resistance Rm1, and is connected to the power supply line 71.

The cathode terminal of the coupling diode Dc1 is connected both to one terminal of the power supply line resistance Rt2 and to the gate terminal Gt2.

The n-type ohmic electrode 124 that is the cathode terminal of the transfer thyristor T1 in the fourth island 144 is connected to the first transfer signal line 72. The first transfer signal line 72 is connected to the φ1 terminal through the current limitation resistance R1 in the sixth island 146. Similarly, an n-type ohmic electrode (not shown in the figure) that is the cathode terminal of the transfer thyristor T2 is connected to the second transfer signal line 73. The second transfer signal line 73 is connected to the φ2 terminal through the current limitation resistance R2 in the seventh island 147. Additionally, the p-type ohmic electrode 135 that is the anode terminal of the start diode Ds in the fifth island 145 is also connected to the second transfer signal line 73.

The connection relationships between the other light-emitting thyristors L, transfer thyristors T, memory thyristors M, diodes (Dm, Dc), power supply line resistances (Rm, Rt) and resistances (Rn) are the same as the above, although the description thereof is omitted here.

Straight lines indicating the connecting relationships in FIG. 6A do not intersect with each other. Thus, the straight lines indicating the connecting relationships in FIG. 6A may be achieved by a wiring layer using one layer made of Al or Al alloy, without using a multi-layer wiring.

A description of a configuration of the light-up signal line 75 according to the first exemplary embodiment will be described later.

As described above, the light-emitting chips C (C1 to C60) that are the self-scanning light-emitting element array (SLED) chips shown in FIG. 5 are configured.

Note that, the planer layout and the cross-sectional view shown in FIGS. 6A and 6B are an example, and another planer layout and another cross-sectional view may be employed.

Although the substrate 80, which is a p-type semiconductor, and the first p-type semiconductor layer 81 are independently provided in the first exemplary embodiment, the first p-type semiconductor layer 81 may be omitted by causing the substrate 80 being the p-type semiconductor to also function as the first p-type semiconductor layer 81.

(Operation of Light-Emitting Portion)

Next, a description will be given of the operation of the light-emitting portion 63.

In each of the light-emitting chips C (C1 to C60) forming the light-emitting portion 63, a sequential operation (light-up control) that causes the light-emitting thyristors L to light up (emit light) and to be put out is performed in sequence by a pair of the first transfer signal $\phi 1$ and the second transfer signal $\phi 2$. Accordingly, the operation of the light-emitting portion 63 is recognized if the operation of the light-emitting chip C1 is described. Hereinafter, the operation of the light-emitting chips C will be described by taking the light-emitting chip C1 as an example.

(Light-Up Control of Light-Emitting Chips)

Figure 7:
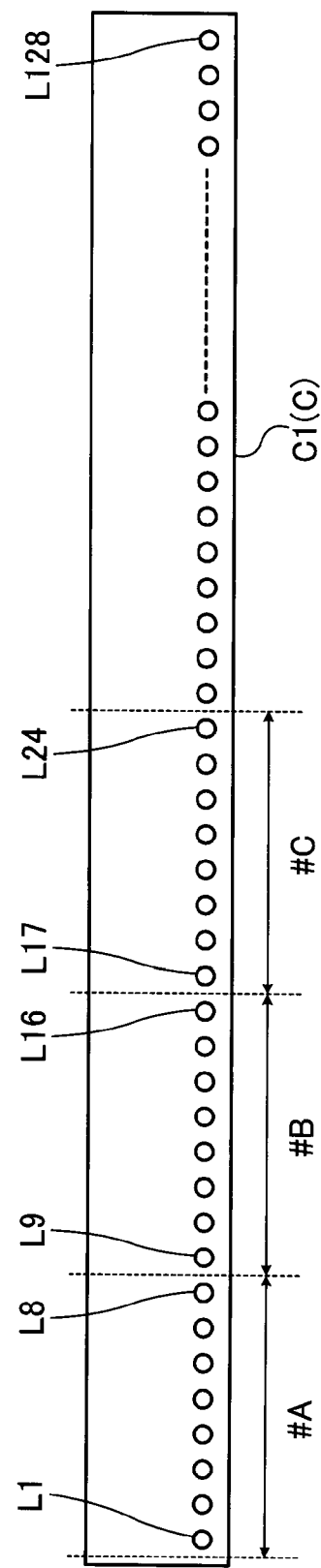
FIG. 7 is a view for explaining a summary of the operation of the light-emitting chip.

FIG. 7 is a view for explaining a summary of the operation of the light-emitting chip C1 (C).

In the first exemplary embodiment, in the light-emitting chip C1 (C), plural light-emitting points (light-emitting thyristors L) set in advance are divided into blocks, and the light-up control is performed on a block-by-block basis.

FIG. 7 shows a case where the light-up control is performed by using a block formed of eight light-emitting thyristors L. In other words, in the first exemplary embodiment, up to the eight light-emitting thyristors L are caused to light up (emit light) simultaneously. First, light-up control is performed on eight light-emitting thyristors L1 to L8, which are shown as a block #A starting from the left end of the light-emitting chip C1 (C). Next, light-up control is performed on eight light-emitting thyristors L9 to L16 in a block #B adjacent to the block #A. If the number of the light-emitting thyristors L provided to the light-emitting chip C is 128, light-up control is repeatedly performed on each of the eight light-emitting thyristors L until the light-up control is performed on the light-emitting thyristor L128, in a similar manner.

In other words, in the first exemplary embodiment, the light-up control is performed on the blocks #A, #B . . . in sequence, in chronological order, and the light-up control is performed on plural light-emitting points (light-emitting thyristors L) simultaneously in each of the blocks #A, #B . . . .

If the blocks #A, #B . . . are not distinguished, they will be hereinafter referred to as blocks.

(Driving Signal Waveforms)

Figure 8:
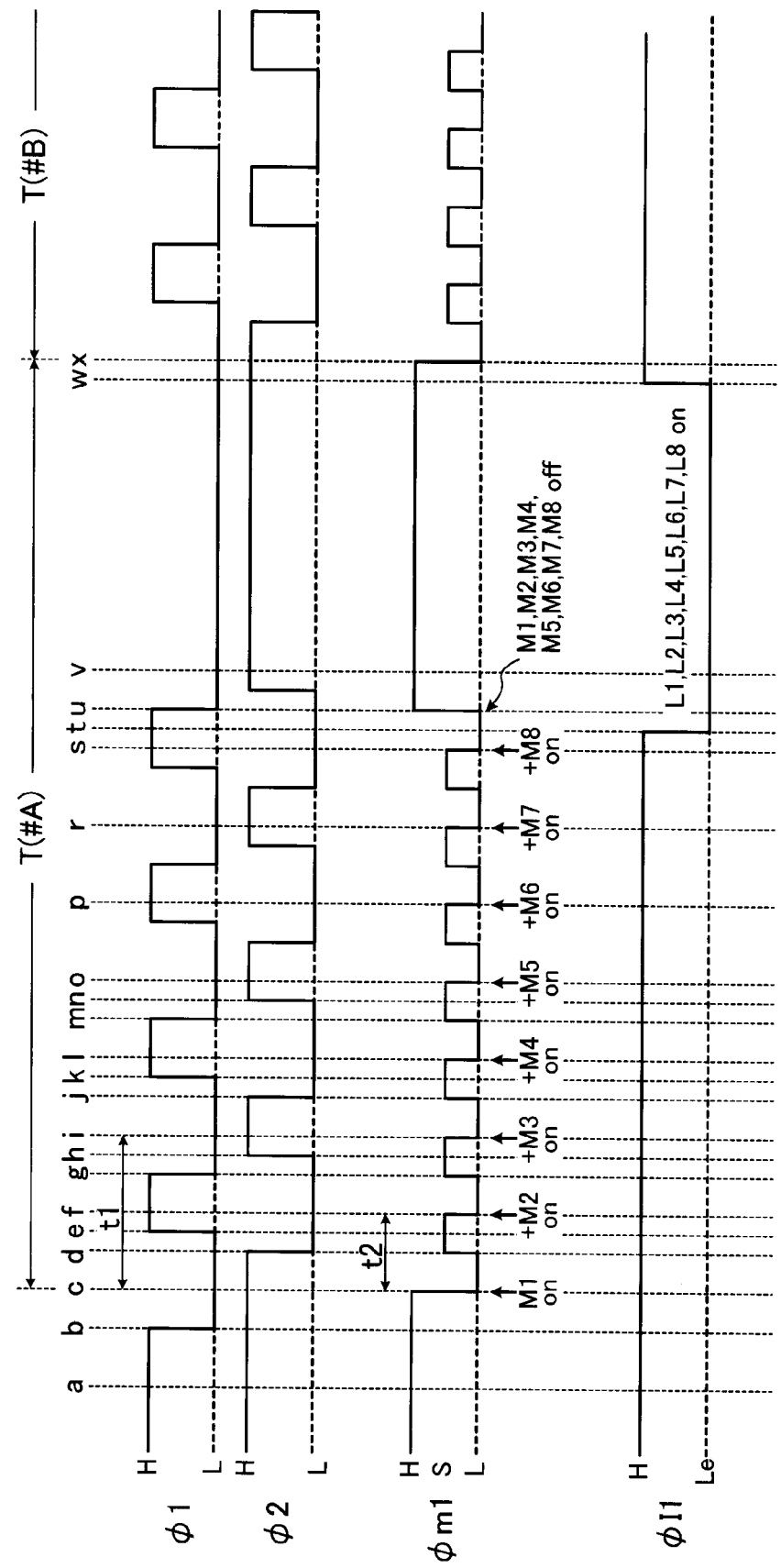
FIG. 8 is a timing chart for explaining the operation of the light-emitting chip.

FIG. 8 is a timing chart for explaining the operation of the light-emitting chip C1 (C). Note that, FIG. 8 shows only a part of the operation that corresponds to the light-up control for the block #A and for a part of the block #B of the light-emitting thyristors L.

In FIG. 8, it is assumed that time elapses from a time point a to a time point x in alphabetical order. The light-up control for the light-emitting thyristors L1 to L8 in the block #A shown in FIG. 7 is performed in a period T(#A) from a time point c to the time point x. The light-up control for the light-emitting thyristors L9 to L16 in the block #B is performed in a period T(#B) after the time point x. Note that the period T(#B) is followed by periods T(#C), T(#D) . . . in which the light-up control respectively for the light-emitting thyristors L in the blocks #C, #D . . . is performed, although not shown in FIG. 8. If the periods T(#A), T(#B) . . . are not distinguished, they will be referred to as periods T.

In the period T(#A) in FIG. 8, it is assumed that printing of image data "11111111" is performed and that all of the eight light-emitting thyristors L1 to L8 in the block #A are thus caused to light up. Also in the period T(#B), it is assumed that printing of the image data "11111111" is performed and that all of the eight light-emitting thyristors L9 to L16 in the block #B are thus caused to light up. Note that the light-emitting thyristors up to L13 are shown in FIG. 8.

The driving signals have similar waveforms repeated in every period such as the periods T(#A), T(#B) . . . , other than the memory signal $\phi m1$ ($\phi m$) that changes on the basis of image data. Therefore, a description will be hereinafter given of only the period T(#A) from the time point c to the time point x. A description will be additionally given of the light-up signal $\phi I1$ ($\phi I$). Note that, a period from the time point a to the time point c is a period for starting the operation of the light-emitting chip C1 (C). A description of the signals in this period will be given in that of the operation.

The first transfer signal $\phi 1$ has a potential at a low level (hereinafter, referred to as "L") at the start time point c of the period T(#A), and the potential thereof is changed to the potential at a high level (hereinafter, referred to as "H") from "L" at a time point e, and then is changed from "H" to "L" at a time point g. The potential of "L" is maintained until a time point i. Then, a waveform in a period t1 from the time point c to the time point i, which is the cycle thereof, is repeated three times from the time point i to a time point v. Thereafter, the potential of "L" is maintained until the finish time point x of the period T(#A).

On the other hand, the second transfer signal $\phi 2$ has a potential of "H" at the start time point c of the period T(#A), and the potential thereof is changed from "H" to "L" at a time point d, and is changed from "L" to "H" at a time point h. Then, the potential of the second transfer signal $\phi 2$ is changed from "H" to "L" at a time point j, and the potential of "H" is maintained until the time point i. Then, a waveform in the period t1 from the time point c to the time point i, which is the cycle thereof, is repeated three times from the time point i to the time point v. Thereafter, the potential of "H" is maintained until the finish time point x of the period T(#A).

Here, in a case where the first transfer signal $\phi 1$ and the second transfer signal $\phi 2$ are compared with each other, the first transfer signal $\phi 1$ and the second transfer signal $\phi 2$ each have the potential alternately repeating "H" and "L" with interposition of the period when both of the potentials thereof are "L" (for example, from the time point d to the time point e, or the time point g to the time point h), in the period from the time point c to a time point p. The period when the first transfer signal φ1 and the second transfer signal φ2 have the potential of "H" at the same time does not exist.

The potential of the memory signal φm1 (φm) is changed from "H" to "L" at the time point c, and is changed from "L" to a potential at a memory level (hereinafter, referred to as "S") at the time point d. Note that, the memory level "S" indicates a potential between "H" and "L," and indicates a potential at which the ON state of the memory thyristor M having been turned on is maintainable, although the detailed description thereof will be given later.

Then, the potential of the memory signal φm1 (φm) is changed from "S" to "L" at a time point f, and is changed from "L" to "S" at the time point g. Thereafter, the potential thereof is changed from "S" to "L" at the time point i.

The memory signal φm1 (φm) has a waveform having the cycle of a period t2 from the time point c to the time point f. The period t1 is twice of the period t2.

Then, the memory signal φm1 (φm) repeats the waveform in a period from the time point f to the time point i, five times from the time point i to a time point s. Note that the waveform from the last time point s to the time point v is different from the others, although the same waveform in the period from the time point f to the time point i is repeated five times from the time point i to the time point s. The potential is changed from "S" to "L" at the time point s; however, the potential is changed from "L" to "H" at a time point u. Thereafter, the potential of "H" is maintained until the time point v. The potential of "H" is further maintained until the finish time point x of the period T(#A).

Note that the waveform of the memory signal φm1 (φm) corresponds to the image data "11111111," as described later.

The relationship between the memory signal φm1 (φm), the first transfer signal φ1 and the second transfer signal φ2 is as follows. The memory signal φ1 (φm) has a potential of "L" in a period where only one of the first transfer signal φ1 and the second transfer signal φ2 has the potential of "L." For example, in the period from the time point c to the time point d, during which the first transfer signal φ1 has the potential of "L," and in the period from the time point f to the time point g, during which the second transfer signal φ2 has the potential of "L," the potential of the memory signal φm1 (φm) is "L."

The light-up signal φI1 (φI) is a signal that supplies electric power for light emission (light-up) to the light-emitting thyristors L. The light-up signal φI1 (φI) has a potential of "H" at the time point c, and the potential thereof is changed to a potential at the light-up level (hereinafter, referred to as "Le") at a time point t. The potential is changed from "Le" to "H" at a time point w. Then, the potential of "H" is maintained at the finish time point x of the period T(#A).

As described later, the light-up level "Le" herein indicates a potential at which the light-emitting thyristor L having the threshold voltage set to be high is ready to be turned on and to light up (emit light). The light-up level "Le" is a potential between "H" and "L."

Hereinabove, the waveforms of the driving signals in the period T(#A) has been described. The driving signals in the periods T(#B) . . . have the same waveforms as those in the period T(#A) other than the memory signal φm1 (φm) that changes on the basis of image data. Thus, the description thereof is omitted herein.

(Basic Operation of Thyristors)

Prior to describing the operation of the light-emitting chip C1 (C), the basic operation of the thyristors (transfer thyristors T, memory thyristors M and light-emitting thyristors L) will be described.

Hereinbelow, as described in FIG. 5, it is assumed that the reference potential Vsub supplied to the anode terminals of the thyristors set as the substrate 80 (Vsub terminals) is set at 0 V ("H"), and the power supply potential Vga supplied to the Vga terminals is set at −3.3 V ("L"), as an example. It is also assumed that the thyristors are configured of p-type semiconductor layers and n-type semiconductor layers, which are made of a compound semiconductor such as GaAs, GaAlAs or the like, stacked on each other, as shown in FIG. 6B, and a diffusion potential (forward potential) Vd of the p-n junction is set at 1.5 V.

The thyristor gets turned on when the lower potential than a threshold voltage (potential larger in negative values) is applied to the cathode terminal thereof. When being turned on (ON), the thyristor goes into a state (ON state) in which the current easily flows between the anode terminal and the cathode terminal thereof. Here, the threshold voltage of the thyristor is a value obtained by subtracting the diffusion potential Vd from the potential of the gate terminal. Accordingly, if the potential of the gate terminal of the thyristor is −1.5 V, the threshold voltage is −3 V. Therefore, the thyristor gets turned on when the potential lower than −3 V is applied to the cathode terminal thereof.

Then, when the thyristor is turned on, the gate terminal of the thyristor has a potential equal to that of the anode terminal of the thyristor (0 V, here). Here, the cathode terminal of the thyristor has a potential equal to the diffusion potential Vd (−1.5 V, here).

If the thyristor is turned on, it is kept in the ON state until the potential of the cathode terminal becomes a potential higher than the potential necessary for keeping the thyristor in the ON state (potential smaller in negative values). For example, if the potential of the cathode terminal becomes 0 V ("H"), and becomes equal to the potential of the anode terminal, the thyristor gets turned off (OFF). When being turned off, the thyristor goes into a state (OFF state) in which the current is difficult to flow between the anode terminal and the cathode terminal thereof.

Meanwhile, since the potential of the cathode terminal being in the ON state is −1.5 V, if the potential lower than −1.5 V is applied to the cathode terminal and the current with which the ON state is maintainable is supplied, the thyristor is kept in the ON state. The potential that keeps the thyristor in the ON state is lower than the potential for turning on the thyristor.

The thyristor may not be changed from the ON state to the OFF state by using the potential of the gate terminal. Thus, the thyristor has a function that keeps (holds, memorizes) the thyristor in the ON state.

Note that, the light-emitting thyristor L lights up (emits light) when being turned on, whereas the light-emitting thyristor L is put out (emits no light) when being turned off. The light-emitting thyristor L uses light emission of the ON state.

With reference to FIG. 5, a description will be given of an operation of the light-emitting portion 63 and the light-emitting chip C1 (C) in accordance with the timing chart shown in FIG. 8.

(Initial State)

At the time point a in the timing chart shown in FIG. 8, the Vsub terminals in the light-emitting chips C (C1 to C60) in the light-emitting portion 63 are set at the reference potential Vsub (0 V), and the Vga terminals thereof are set at the power supply potential Vga (−3.3 V) (see FIG. 4).

Further, the transfer signal generating unit 120 sets the potentials of the first transfer signal φ1 and the second transfer signal φ2 at "H," while the memory signal generating unit 130 sets the potentials of the memory signals φm (φm1 to φm60)

at "H" (see FIG. 4). Similarly, the light-up signal generating unit 110 sets the light-up signals φI (φI1 to φI30) at "H" (see FIG. 4).

Then, the potential of the first transfer signal line 106 becomes "H," and the first transfer signal line 72 of each light-emitting chip C becomes "H" through the φ1 terminal of each light-emitting chip C in the light-emitting portion 63. Similarly, the potential of the second transfer signal line 107 becomes "H," and the second transfer signal line 73 of each light-emitting chip C becomes "H" through the φ2 terminal of each light-emitting chip C. The potentials of the memory signal lines 108 (108_1 to 108_60) are set at "H," and the potential of the memory signal line 74 of each light-emitting chip C becomes "H" through the φm terminal of each light-emitting chip C. Furthermore, the potentials of the light-up signal lines 109 (109_1 to 109_30) are set at "H," and the light-up signal line 75 of each light-emitting chip C becomes "H" through the φI terminal of each light-emitting chip C.

Hereinbelow, the operation of the light-emitting chip C will be described by taking the light-emitting chip C1 as an example, since the light-emitting chips C1 to C60 are operated in parallel.

The potentials of the first transfer signal line 72, the second transfer signal line 73, the memory signal line 74 and the light-up signal line 75, which are connected to the cathode terminals of the transfer thyristors T, the memory thyristors M and the light-emitting thyristors L, are set at "H." Thus, the potentials of all the anode terminals and the cathode terminals of the transfer thyristors T, the memory thyristors M and the light-emitting thyristors L are "H." Accordingly, the transfer thyristors T, the memory thyristors M and the light-emitting thyristors L are in the OFF state.

The gate terminals Gt of the transfer thyristors T are set at the power supply potential Vga ("L": −3.3 V) through the respective power supply line resistances Rt.

Similarly, the gate terminals Gm of the memory thyristors M (and also the gate terminals Gl of the light-emitting thyristors L) are set at the power supply potential Vga ("L": −3.3 V) through the respective power supply line resistances Rm.

The gate terminal Gt1 located on the one end side of the transfer thyristor array in FIG. 5 is connected to the cathode terminal of the start diode Ds. The anode terminal of the start diode Ds is connected to the second transfer signal line 73 having the potential of "H." Thereby, the voltage in the forward direction is applied to the start diode Ds (forward bias). Thus, the gate terminal Gt1 to which the cathode terminal of the start diode Ds is connected has a value of −1.5 V, which is obtained by subtracting the diffusion potential Vd of the start diode Ds (1.5 V) from the potential "H" of the anode terminal of the start diode Ds (0 V). Therefore, the threshold voltage of the transfer thyristor T1 becomes −3 V obtained by subtracting the diffusion potential Vd (1.5 V) from the potential of the gate terminal Gt1 (−1.5 V).

Note that, the gate terminal Gt2 of the transfer thyristor T2 adjacent to the transfer thyristor T1 is connected to the gate terminal Gt1 through the coupling diode Dc1, and thus the potential thereof becomes −3 V obtained by subtracting the diffusion potential Vd (1.5 V) of the coupling diode Dc1 from the potential of the gate terminal Gt1 (−1.5 V), and the threshold voltage of the transfer thyristor T2 becomes −4.5 V.

Further, the gate terminal Gt3 of the transfer thyristor T3 is to become −4.5 V in accordance with this calculation. However, since the potential thereof does not become a value lower than the power supply potential Vga (−3.3 V), the potential thereof is −3.3 V. In other words, each terminal does not have a potential lower than the power supply potential Vga (−3.3 V) in the first exemplary embodiment. The threshold voltage of the thyristor having the gate terminal set at the power supply potential Vga (−3.3 V) becomes −4.8 V.

Similarly, the gate terminal Gm1 of the memory thyristor M1 (and also the gate terminal Gl1 of the light-emitting thyristor L1) is connected to the gate terminal Gt1 through the connecting diode Dm1, and thus the potential thereof becomes −3 V obtained by subtracting the diffusion potential Vd of the connecting diode Dm1 (1.5 V) from the potential of the gate terminal Gt1 (−1.5 V). Accordingly, the threshold voltage of the memory thyristor M1 (and also light-emitting thyristor L1) becomes −4.5 V.

As described above, the potential of the gate terminal of the thyristor and the threshold voltage thereof may be obtained. However, in the first exemplary embodiment, the thyristors each having the threshold voltage lower than the power supply potential Vga (−3.3 V) are not operated, and thus the description thereof will be omitted below.

(Start of Operation)

At a time point b, the potential of the first transfer signal φ1 is changed from "H" (0 V) to "L" (−3.3 V). Then, the transfer thyristor T1 having the threshold voltage of −3 V gets turned on. The odd-numbered transfer thyristors T each having a number not less than 3 have the threshold voltage of −4.8 V, and thus they does not get turned on. Meanwhile, the transfer thyristor T2 has the threshold voltage of −4.5 V. However, since the potential of the first transfer signal φ1 is "H" (0 V), the transfer thyristor T2 does not get turned on.

When the transfer thyristor T1 gets turned on, the potential of the gate terminal Gt1 becomes "H" (0 V) that is the potential of the anode terminal. Then, the potential of the cathode terminal of the transfer thyristor T1 (first transfer signal line 72) becomes −1.5 V.

Thereby, the coupling diode Dc1 becomes forward-biased, and the potential of the gate terminal Gt2 becomes −1.5 V obtained by subtracting the diffusion potential Vd (1.5 V) of the coupling diode Dc1 from the potential of the gate terminal Gt1 (0 V). Thereby, the threshold voltage of the transfer thyristor T2 becomes −3 V.

However, since the potential of the second transfer signal φ2 is "H," the transfer thyristor T2 does not get turned on.

When the transfer thyristor T1 gets turned on and the potential of the gate terminal Gt1 becomes "H" (0 V), the connecting diode Dm1 becomes forward-biased. Thereby, the potential of the gate terminal Gm1 (and also the gate terminal Gl1) becomes −1.5 V, and the threshold voltage of the memory thyristor M1 (and also the light-emitting thyristor L1) becomes −3 V. However, since the potentials of the memory signal φm1 (φm) and the light-up signal φI1 (φI) are 0 V ("H"), the memory thyristor M1 and the light-emitting thyristor L1 does not get turned on.

Accordingly, only the transfer thyristor T1 is in the ON state immediately after the time point b (indicating time after the change of the states of the thyristors and the like occurs in accordance with the potential change of the signals at the time point b).

(Operation Start)

At the time point c, the potential of the memory signal φm1 (φm) changes from "H" (0 V) to "L" (−3.3 V). Thereby, the memory thyristor M1 having the threshold voltage of −3 V gets turned on.

When the memory thyristor M1 gets turned on, the potential of the gate terminal Gm1 (the gate terminal Gl1) becomes "H" (0 V), similarly to the case of the transfer thyristor T1. Thereby, the threshold voltage of the light-emitting thyristor L1 becomes −1.5 V. However, since the potential of the light-up signal φI1 (φI) is "H" (0 V), the light-emitting thyristor L1 does not get turned on. Thus, the light-emitting thyristor L1 does not light up (not emit light).

Accordingly, the transfer thyristor T1 and the memory thyristor M1 are kept in the ON state immediately after the time point c.

Note that, the potential of the cathode terminal of the memory thyristor M1 becomes −1.5 V obtained by subtracting the diffusion potential Vd (1.5 V) from "H" (0 V). However, the memory thyristor M1 is connected to the memory signal line 74 through the resistance Rn1. Thereby, the potential of the memory signal line 74 is maintained at "L" (−3.3 V).

At the time point d, the potential of the memory signal φm1 (φm) is changed from "L" to "S," and the potential of the second transfer signal φ2 is changed from "H" to "L."

The memory level "S" is a potential at which the memory thyristor M being in the OFF state is not allowed to get turned on while the memory thyristor M being in the ON state is kept in the ON state.

As mentioned above, the threshold voltage of the memory thyristor M that is caused to be turned on at the time point c is −3 V. However, the potential of the cathode terminal of the memory thyristor M being in the ON state is −1.5 V. Thus, "S" is set at a potential that is higher than the threshold voltage (−3 V) for causing the memory thyristor M to be turned on and that is lower than the potential of the cathode terminal being in the ON state (−1.5 V) (−3V<"S"≦−1.5 V).

Accordingly, if the potential of the memory signal φm1 (φm) is changed from "L" to "S," the memory thyristor M1 being in the ON state is kept in the ON state.

Meanwhile, when the potential of the second transfer signal φ2 is changed from "H" to "L," the transfer thyristor T2 having the threshold voltage of −3 V gets turned on.

When the transfer thyristor T2 gets turned on, the potential of the gate terminal Gt2 becomes "H" (0 V). Then, the threshold voltage of the transfer thyristor T3 having the gate terminal Gt3 connected to the gate terminal Gt2 through the coupling diode Dc2 becomes −3 V. Similarly, the respective threshold voltages of the memory thyristor M2 and the light-emitting thyristor L2 that have the gate terminal Gm2 (Gl2) connected to the gate terminal Gt2 through the connecting diode Dm2 becomes −3 V.

At this time, since the transfer thyristor T1 is kept in the ON state, the potential of the first transfer signal line 72 to which the cathode terminal of the transfer thyristor T3 is connected is −1.5 V. Thus, the transfer thyristor T3 does not get turned on.

In addition, since the potential of the memory signal φm1 (φm) is "S," the memory thyristor M2 does not get turned on, either. Similarly, since the potential of the light-up signal φI1 (φI) is "H," the light-emitting thyristor L2 does not get turned on, either.

Immediately after the time point d, the transfer thyristors T1 and T2 and the memory thyristor M1 are maintained in the ON state.

At the time point e, the potential of the first transfer signal φ1 is changed from "L" to "H." Thereby, both of the potentials of the cathode terminal and the anode terminal of the transfer thyristor T1 become "H," and thus the transfer thyristor T1 gets turned off.

At this time, since the gate terminal Gt1 of the transfer thyristor T1 is connected to the power supply line 71 through the power supply line resistance Rt1, the potential thereof becomes −3.3 V that is the power supply potential Vga. Meanwhile, the gate terminal Gt2 has a potential of 0 V. Accordingly, the coupling diode Dc1 goes into a reversely-biased state, and thus the potential "H" (0 V) of the gate terminal Gt2 does not affect the gate terminal Gt1.

Specifically, the potential of the gate terminal connected to the gate terminal having the potential of "H" (0 V) through the reversely-biased diode is not affected by the gate terminal having the potential of "H" (0 V). Thus, the description thereof will be omitted below.

Immediately after the time point e, the transfer thyristor T2 and the memory thyristor M1 are kept in the ON state.

Next, when the potential of the memory signal φm1 (φm) is changed from "S" to "L" (−3.3 V) at the time point f, the memory thyristor M2 having the threshold voltage of −3 V newly gets turned on (which is shown as +M2 on in FIG. 8, similarly hereinafter). In other words, in addition to the memory thyristor M1 having been in the ON state, the memory thyristor M2 goes into the ON state. Thereby, the potential of the gate terminal Gm2 becomes "H" (0 V), and the threshold voltage of the light-emitting thyristor L2 becomes −1.5 V. However, since the potential of the light-up signal φI1 (φI) is "H" (0 V), the light-emitting thyristor L2 does not get turned on. Thus, the light-emitting thyristor L2 does not light up (not emit light).

Accordingly, immediately after the time point f, the transfer thyristor T1 and the memory thyristors M1 and M2 are kept in the ON state.

At the time point g, the potential of the memory signal φm1 (φm) is changed from "L" to "S," and the potential of the first transfer signal φ1 is changed from "H" to "L."

Even when the potential of the memory signal φm1 (φm) is changed from "L" to "S," the memory thyristors M1 and M2 being in the ON state are kept in the ON state.

Meanwhile, when the potential of the first transfer signal φ1 is changed from "H" to "L," the transfer thyristor T3 having the threshold voltage of −3 V gets turned on. Then, the potential of the gate terminal Gt3 becomes "H" (0 V), and the threshold voltage of the transfer thyristor T4 connected to the gate terminal Gt3 through the coupling diode Dc3 becomes −3 V. Similarly, the threshold voltage of the memory thyristor M3 connected to the gate terminal Gt3 through the connecting diode Dm3 becomes −3 V.

At this time, the transfer thyristor T2 is kept in the ON state. Thereby, the potential of the second transfer signal line 73 to which the cathode terminal of the transfer thyristor T2 is connected is maintained at −1.5 V, and thus the transfer thyristor T4 does not get turned on.

In addition, since the potential of the memory signal φm1 (φm) is "S," the memory thyristor M3 does not get turned on.

Immediately after the time point g, the transfer thyristors T2 and T3 and the memory thyristors M1 and M2 are kept in the ON state.

Then, at the time point h, the potential of the second transfer signal φ2 is changed from "L" to "H." Thereby, the transfer thyristor T2 gets turned off similarly to the case at the time point e. The gate terminal Gt2 of the transfer thyristor T2 becomes −3.3 V that is the power supply potential Vga, through the power supply line resistance Rt2.

Immediately after the time point h, the transfer thyristor T3 and the memory thyristors M1 and M2 are kept in the ON state.

When the potential of the memory signal φm1 (φm) is changed from "S" to "L" (−3.3 V) at the time point i, the memory thyristor M3 having the threshold voltage of −3 V gets turned on, similarly to the case at the time point f. Thereby, the potential of the gate terminal Gm3 (the gate terminal Gl3) becomes "H" (0 V), and thus the threshold voltage of the light-emitting thyristor L3 becomes −1.5 V. However, since the potential of the light-up signal φI1 (φI) is "H" (0 V), the light-emitting thyristor L3 does not get turned on. Thus, the light-emitting thyristor L3 does not light up (not emit light).

Accordingly, immediately after the time point i, the transfer thyristor T3 and the memory thyristors M1, M2 and M3 are kept in the ON state.

As described above, the memory thyristors M1 to M8 are sequentially caused to be turned on in a period from the time point c to the time point s, on the basis of the image data "11111111" supplied in the period T(#A).

As a result, immediately after the time point s, the transfer thyristor T8 and the memory thyristors M1 to M8 are kept in the ON state. The threshold voltages of the light-emitting thyristors L1 to L8 are −1.5 V.

When the potential of the light-up signal φI1 (φI) is changed from "H" to "Le" at the time point t, the light-emitting thyristors L1 to L8 having the threshold voltages of −1.5 V get turned on, and light up (emit light).

The light-up level "Le" is selected so that only the light-emitting thyristors L connected to the memory thyristors M in the ON state and having high threshold voltages (−1.5 V) get turned on.

Even if the memory thyristors M are not in the ON state, if the transfer thyristors T are in the ON state, the potentials of the gate terminals Gm (G1) become −1.5 V. Thereby, the threshold voltages of the light-emitting thyristors L become −3 V. However, the light-emitting thyristors L having the threshold voltages of −3 V must not caused to be turned on with "Le."

Thus, the light-up level "Le" is set so as to be lower than −1.5 V, which is the threshold voltages of the light-emitting thyristors L when the memory thyristors M are in the ON state, and to be higher than −3 V (−3 V<"Le"≦−1.5 V).

Note that the cathode terminals of the light-emitting thyristors L are connected to the light-up signal line 75 without resistances such as the resistances Rn, as shown in FIG. 5. If the light-up signal φI1 is subjected to current driving, the light-emitting thyristors L1 to L8 are ready to be turned on even without the resistances. In other words, in the first exemplary embodiment, plural light-emitting thyristors L (eight light-emitting thyristors L, here) are caused to light up simultaneously.

Note that, in the first exemplary embodiment, "lighting-up simultaneously" indicates a state in which the light-emitting thyristor L having the threshold voltage higher than "Le" lights up by changing the potential of the light-up signal φI1 (φI) from "H" to "Le." At this time, as mentioned above, the number of the light-emitting thyristors L may be plural.

Immediately after the time point t, the transfer thyristor T8, the memory thyristors M1 to M8 and the light-emitting thyristors L1 to L8 are in a light-up (ON) state.

Next, at the time point u, the potential of the memory signal φm1 (φm) is changed from "L" to "H." Then, all of the memory thyristors M1 to M8 kept in the ON state get turned off. Thereby, the information on the positions (numbers) of the light-emitting thyristors L intended to light up (1 to 8) is lost from the memory thyristors M.

However, since the light-emitting thyristors L1 to L8 have already got turned on at the time point t prior to the point u, it is acceptable that the information on the positions (numbers) of the light-emitting thyristors L intended to light up (1 to 8, here) is lost. In other words, the memory thyristors M have a function to memorize the information on the positions (numbers) of the light-emitting thyristors L intended to light up.

At the same time point u, by changing the potential of the first transfer signal φ1 from "H" to "L" (−3.3 V), the transfer thyristor T9, which has the threshold voltage of −3 V, gets turned on.

Accordingly, immediately after the time point u, the transfer thyristors T8 and T9 and the light-emitting thyristors L1 to L8 are in the light-up (ON) state.

When the potential of the light-up signal φI1 (φI) is changed from "Le" to "H" at the time point w, the light-emitting thyristors L1 to L8 in the light-up (ON) state get turned off to be put out.

Immediately after the time point w, the transfer thyristor T9 is kept in the ON state.

Thereafter, the period T(#B) during which the light-up control for the light-emitting thyristors L9 to L16 in the block #B is performed starts from the time point x. Since the operation in the period T(#A) is repeated in the period T(#B), a description thereof is omitted.

In the above description, it is assumed that all of the light-emitting thyristors L1 to L8 are caused to light up in the period T(#A). However, in a case where a specific light-emitting thyristor L is not caused to light up, the potential of the memory signal φm1 (φm) may be maintained at "S" at timing, such as the time point c, when the memory thyristors M are caused to get turned on. Thus, the memory thyristors M may be caused not to get turned on (to be maintained in the OFF state). The reason is as follows: when a memory thyristor M is in the OFF state, the light-emitting thyristor L connected to the memory thyristor M has the threshold voltage of −3 V or less; thus the memory thyristor M is not allowed to get turned on with the potential "Le" of the light-up signal φI1 (φI).

As described above, in the first exemplary embodiment, in order to cause the eight light-emitting thyristors L1 to L8 in the block #A to light up simultaneously in the period T(#A), the memory thyristors M1 to M8 are caused to be turned on to memorize the information on the positions (numbers) of the light-emitting thyristors L1 to L8. Then, the light-emitting thyristors L1 to L8 are caused to light up (emit light) simultaneously in a period from the time point t to the time point w.

Note that, as described above, the first transfer signal φ1 and the second transfer signal φ2 are sharably supplied to the light-emitting chips C (C1 to C60), and the light-emitting chips C (C1 to C60) are operated in parallel. Further, the memory signals φm (φm1 to φm60), which designate the light-emitting thyristors L to be intended to light up, are individually supplied to the light-emitting chips C (C1 to C60) on the basis of the image data. Furthermore, each of the light-up signals φI (φI1 to φI30) is sharably supplied to the corresponding pair formed of two of the light-emitting chips C (C1 to C60). The light-up signal φI supplies a current with current driving in one light emission period (for example, a period from the time point t to the time point w in FIG. 8) in accordance with the number of the light-emitting thyristors L to be caused to light up among the two light-emitting chips C belonging to the pair. In one light emission period, the number of the light-emitting thyristors L to be caused to light up has been figured out by the image data. Thus, the current for the light-up signal φI may be set in accordance with the number of the light-emitting thyristors L to be caused to light up.

In the first exemplary embodiment, each of the light-up signals φI is shared between two of the light-emitting chips C (C1 to C60). By this configuration, the number (30) of the light-up signal lines 109 (109_1 to 109_30) is set smaller than the number (60) of the light-emitting chips C (C1 to C60). Therefore, the width of the circuit board 62 is suppressed to increase.

Additionally, plural light-emitting elements are caused to light up simultaneously in the first exemplary embodiment. Thus, if the amount of exposure per unit time is set to be fixed, the plural light-emitting chips C may be serially connected as if to be one light-emitting chip C, and the memory signal φm and the light-up signal φI may be sharably supplied to these plural light-emitting chips C. This configuration may also reduce the number of the light-up signal lines 109.

(Light-Up Signal Line)

Hereinafter, a description will be given of the light-up signal line 75 in detail.

FIG. 9A is a planar layout of the light-up signal line 75 of the first exemplary embodiment. FIG. 9B is a diagram illustrating an equivalent circuit of the light-up signal line 75 shown in FIG. 9A.

FIG. 9A shows a part including the light-emitting thyristors L1 to L13 and the light-up signal line 75 of the light-emitting chip C1 (C). Although being shown as a straight line in FIG. 6A, the light-up signal line 75 is shown as a wide pattern in FIG. 9A.

Note that, in FIG. 9A, the light-up signal line 75 is provided between the light-emitting thyristors L and the memory thyristors M, as in FIGS. 6A and 6B. The memory thyristors M are not shown in FIG. 9A.

In FIGS. 9A and 9B, portions similar to those shown in FIGS. 6A and 6B are denoted by the same reference numerals as those, and a detailed description thereof will be omitted.

In the first exemplary embodiment, the light-up signal line 75 includes a main wiring 750 and block wirings 75A, 75B . . . .

The cathode terminals of the light-emitting thyristors L belonging to the blocks #A, #B . . . are connected to the block wirings 75A, 75B . . . , respectively. Each of the block wirings 75A, 75B . . . is connected to the main wiring 750 at a connection point S provided at a midpoint (barycenter) thereof.

For example, as shown in FIG. 9A, the cathode terminals of the light-emitting thyristors L1 to L8 belonging to the block #A are connected to each other with the block wiring 75A, and similarly, the cathode terminals of the light-emitting thyristors L9 to L16 belonging to the block #B are connected to each other with the block wiring 75B. The same applies to the other blocks #C, #D . . . . Then, the block wirings 75A, 75B . . . are connected to the main wiring 750 at the respective connection points S. In other words, the light-up signal line 75 has a tree structure having the main wiring 750 as a trunk and the block wirings 75A, 75B . . . as branches.

The light-up signal line 75 shown in FIG. 9A has one stage of tree branching, and is therefore called a one-stage-branching light-up signal line 75 herein.

Even when being formed of low-resistant Al or Al alloy, the main wiring 750 and the block wirings 75A, 75B . . . have a resistance (hereinafter, called a parasite resistance). Similarly, each light-emitting thyristor L in the ON state also has a parasite resistance Rp.

Accordingly, the light-up signal line 75 shown in FIG. 9A is represented as the equivalent circuit shown in FIG. 9B. For example, in such an approximate circuit, the main wiring 750 has a parasite resistance Rw near the φI terminal and has a parasite resistance Rb between the block wiring 75A and the block wiring 75B. In the approximate circuit, the block wiring 75A has a parasite resistance Ral between each two of the light-emitting thyristors L. Accordingly, the light-emitting thyristors L and the light-up signal line 75 may be approximated as a distributed constant circuit (FIG. 9B) formed by a distribution of the parasite resistances Rw, Rb, Rp, and Ral (resistance distribution).

FIG. 10A is a planar layout of the light-up signal line 75 in a case where the first exemplary embodiment is not employed. FIG. 10B is a diagram illustrating an equivalent circuit of the light-up signal line 75 shown in FIG. 10A.

In the case where the first exemplary embodiment is not employed, a block wiring is not provided for each of the blocks (block #A, #B . . . ), and the cathode terminal of each light-emitting thyristor L is connected directly to the light-up signal line 75, which is a main wiring.

Thus, as shown in FIG. 10B, for example, the value of a resistance (Rw+Rp) of the line from the φI terminal to the anode terminal of the light-emitting thyristor L1 is different from the value of a resistance (Rw+7×Ral+Rp) of the line from the φI terminal to the anode terminal of the light-emitting thyristor L8 (The light-emitting thyristors L are regarded separately here.). Such difference also applies to the other light-emitting thyristors L2 to L7.

If the light-emitting thyristors L1 to L8 are caused to light up individually by constant-current driving, the light amounts of the respective light-emitting thyristors L are the same. This is because, assuming that a current Ia is needed to light up one light-emitting thyristor L, the current Ia flows to each of the light-emitting thyristors L even when the value of a resistance of the current Ia from the φI terminal to the light-emitting thyristor L is different among the light-emitting thyristors L.

On the other hand, in a case where the light-emitting thyristors L1 to L8 are intended to light up simultaneously, even when a current of 8×Ia is supplied to cause eight light-emitting thyristors L to light up, the current does not flow to the light-emitting thyristors L1 to L8 evenly, causing a difference among the light-emitting thyristors L1 to L8, as is predictable from the equivalent circuit (distributed constant circuit) shown in FIG. 10B. In other words, there is a distribution of the currents flowing to the respective light-emitting thyristors L (current distribution). As a result, the light-emitting thyristors L1 to L8 caused to light up simultaneously have light amounts different from each other.

In this regard, in the first exemplary embodiment shown in FIG. 9A, provision of the block wiring 75A allows the value of a resistance of the line from the anode terminal of the light-emitting thyristor L1 to the φI terminal to be the same as that of the line from the anode terminal of the light-emitting thyristor L8 to the φI terminal. Meanwhile, the value of a resistance of the line from the anode terminal of the light-emitting thyristor L1 to the φI terminal is the most different from that of the line from the anode terminal of the light-emitting thyristor L4 to the φI terminal. Nonetheless, this difference in resistance value (the difference between the light-emitting thyristors L1 and L4) is small compared to the case shown in FIG. 10A where the first exemplary embodiment is not employed (the difference between the light-emitting thyristors L1 and L8). This is because the parasite resistances are symmetrically distributed to the left and right in the figure with respect to the connection point S.

For that reason, the first exemplary embodiment reduces a variation in light amount among the light-emitting thyristors L caused to light up simultaneously in any of the blocks #A, #B . . . .

Further, as is appreciated from FIG. 9A, when the number of the light-emitting thyristors L in one block is an even number, the difference in resistance value is small compared to a case where the number thereof is an odd number.

Figure 11:
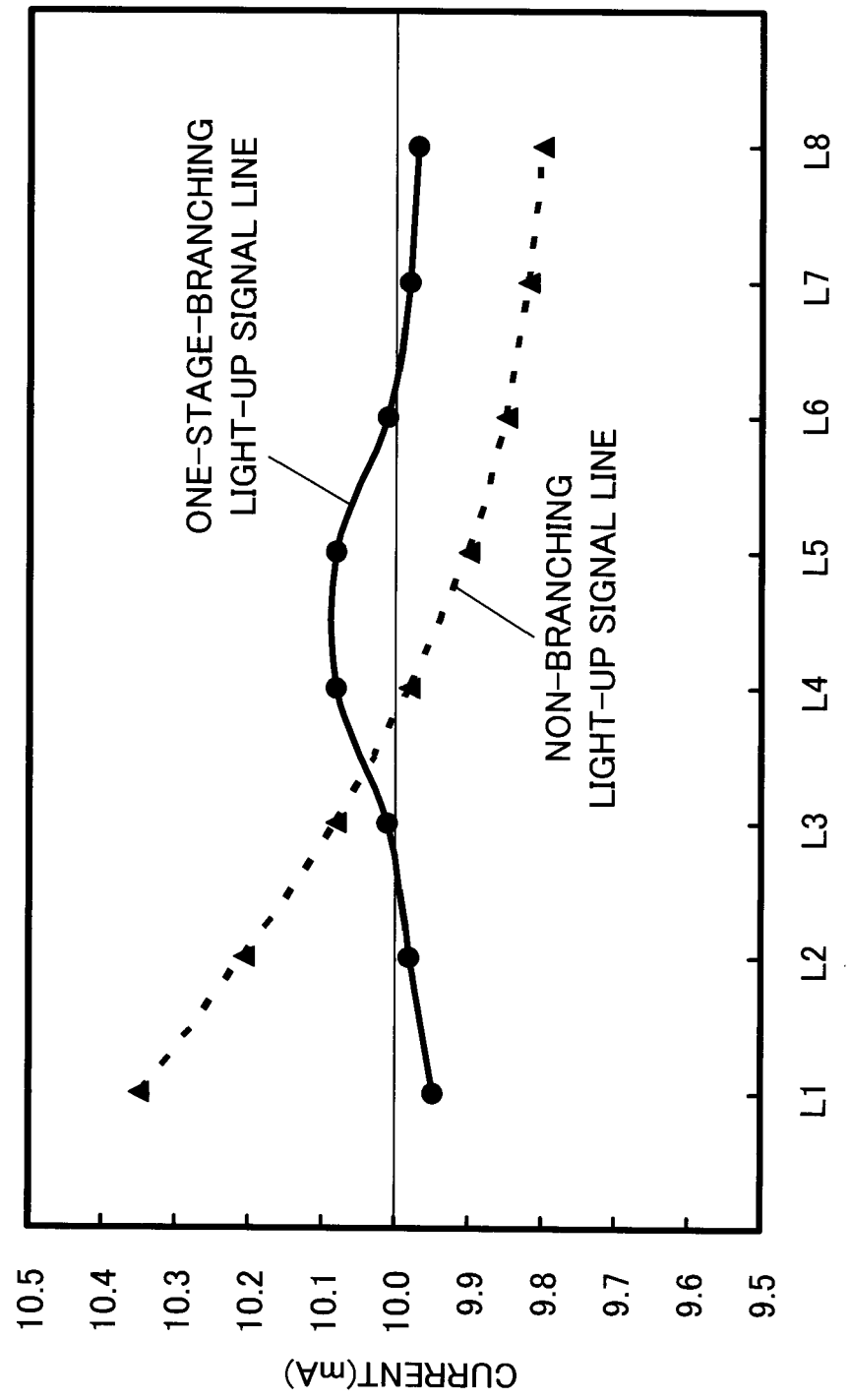
FIG. 11 is a graph illustrating currents flowing to the respective light-emitting thyristors in the first exemplary embodiment.

FIG. 11 is a graph illustrating currents flowing to the respective light-emitting thyristors L in the first exemplary embodiment shown in FIGS. 9A and 9B (the one-stage-branching light-up signal line). The horizontal axis in FIG. 11 indicates the light-emitting thyristor L numbers. Here, the light-emitting thyristors L1 to L8 in the block #A are caused to light up simultaneously. The vertical axis in FIG. 11 indicates the values of the currents flowing to the respective light-emitting thyristors L1 to L8. Note that FIG. 11 also shows the case shown in FIGS. 10A and 10B where the present exemplary embodiment is not employed (the non-branching light-up signal line).

If Al is used as the material for the light-up signal line 75, the resistivity is $2.75 \times 10^{-8}$ Ω·m. The main wiring 750 and the block wiring 75A each have a film thickness of 1 μm and a width of 14.5 μm. If the pitch between the light-emitting thyristors L is 21.17 μm, the parasite resistance Ral is 0.04Ω. On the other hand, the parasite resistance Rp of the light-emitting thyristor L in the ON state is 20Ω.

In addition, assuming that a current flowing to one light-emitting thyristor L (one light-emitting point) in the light-up (ON) state is 10 mA, a current of 8×10 mA=80 mA is supplied from the back-side common electrode of the substrate 80 in order to cause eight light-emitting thyristors L1 to L8 to light up simultaneously.

A current for causing the light-emitting thyristors L to light up individually is 10 mA, regardless of which one to be caused to light up among the light-emitting thyristors L1 to L8. However, when the light-emitting thyristors L1 to L8 are caused to light up simultaneously in the case shown in FIGS. 10A and 10B where the first exemplary embodiment is not employed (the non-branching light-up signal line), the current decreases as the light-emitting thyristor number increases from L1 to L8, as shown in FIG. 11. Specifically, there is a 5.5% difference in current between the light-emitting thyristors L1 and L8. As a result, the light-emitting thyristors L1 to L8 have different light amounts. This is because the value of a resistance of the line from the anode terminal of the light-emitting thyristor L to the ϕI terminal increases as the light-emitting thyristor number increases from L1 to L8, as is appreciated from FIG. 10B.

Moreover, since the eight light-emitting thyristors L1 to L8 are driven simultaneously, it is impossible to adjust the current and the light-up period for each of the light-emitting thyristors L, making it difficult to adjust the light amounts separately. In addition, a change in light amount appears periodically between the blocks each including eight light-emitting thyristors L, and is therefore easily noticeable as an unevenness in an image formed by the image forming apparatus 1.

In the first exemplary embodiment shown in FIGS. 9A and 9B (the one-stage-branching light-up signal line), on the other hand, a current flowing to the light-emitting thyristor L increases as the light-emitting thyristor number increases from L1 to L4. Symmetrically, a current flowing to the light-emitting thyristor L decreases as the light-emitting thyristor number increases from L5 to L8. In other words, a current distribution among the light-emitting thyristors L1 to L8 tends to have a shape of a symbol Λ.

The difference in current is 1.2% between the light-emitting thyristors L1 and L4. This indicates that the difference in current in the one-stage-branching light-up signal line 75 is ⅕ of that in the non-branching light-up signal line 75. Accordingly, the first exemplary embodiment is capable of reducing a variation in light amount.

As is appreciated from FIG. 9A, the one-stage-branching light-up signal line 75 of the first exemplary embodiment requires twice the width of the non-branching light-up signal line 75 of FIG. 10A. In order for the light-up signal line 75 not to have an increased width, the width of each of the main wiring 750 and the block wirings 75A, 75B . . . in the one-stage-branching light-up signal line 75 of FIG. 9A are reduced by ½. Consequently, the difference in current is 2.4% between the light-emitting thyristors L1 and L4. Even in this case, the difference in current observed in the one-stage-branching light-up signal line 75 is ½ of that in the non-branching light-up signal line 75.

In this way, even when the one-stage-branching light-up signal line 75 has the same width as the non-branching light-up signal line 75, the difference between currents flowing to the respective light-emitting thyristors L in the one-stage-branching light-up signal line 75 is small compared to the case of the non-branching light-up signal line 75. Thus, a variation in light amount may be reduced.

(Influence by Parasite Resistances of Substrate)

Now, an influence by the resistances (parasite resistances) of the substrate 80 is considered.

The descriptions set forth so far have dealt with a case where the resistances of the substrate 80 are small and therefore do not affect the difference in current (light amount) among the light-emitting thyristors L caused to light up simultaneously.

However, when the substrate 80 or the first p-type semiconductor layer 81 has a high resistance, the parasite resistances of the substrate 80 or the like affect the difference in current (light amount) among the light-emitting thyristors L caused to light up simultaneously.

Figure 12:
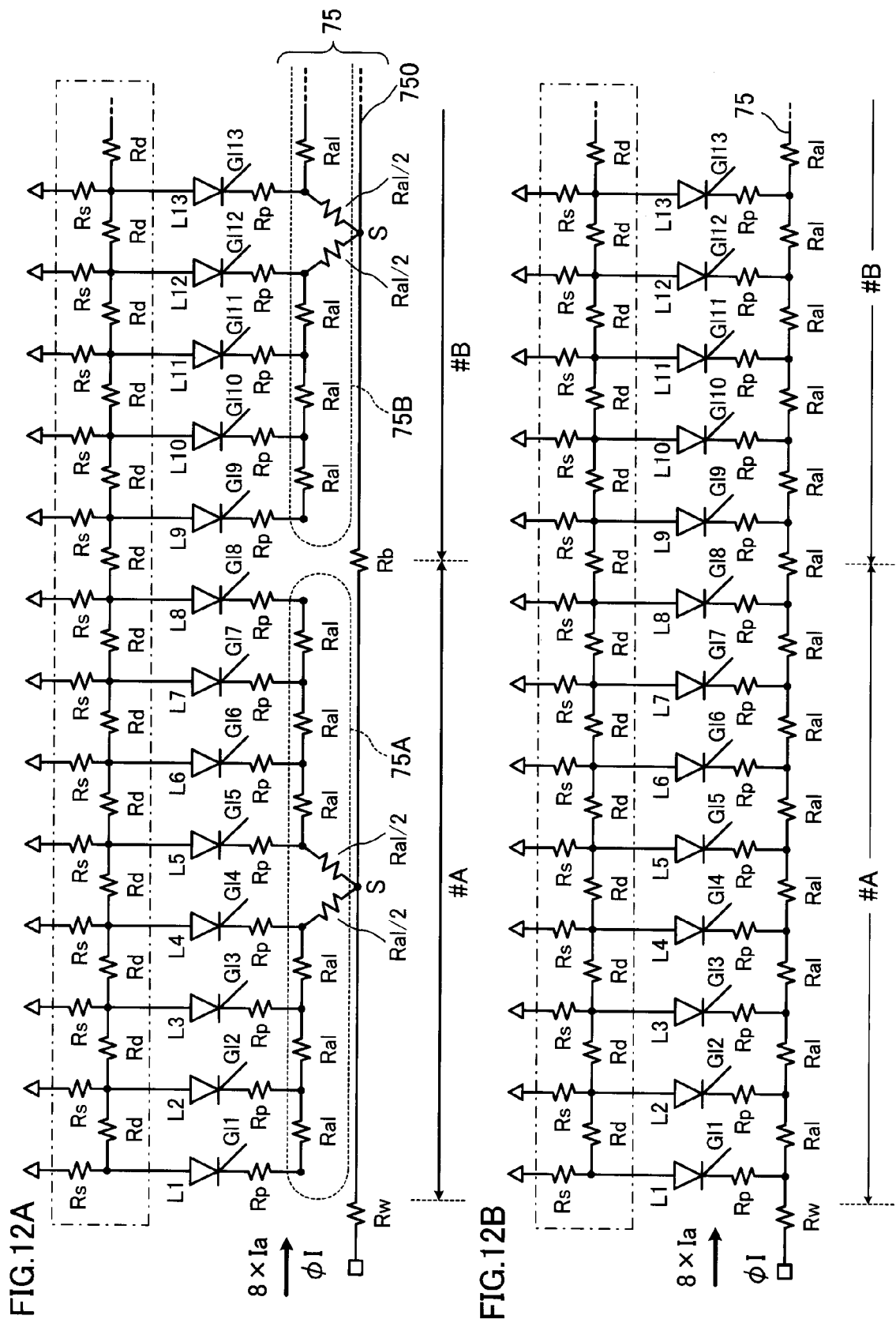
FIG. 12A is a diagram illustrating an equivalent circuit of a light-up signal line taking the influence by the parasite resistances of the substrate into consideration in the first exemplary embodiment.
FIG. 12B is a diagram illustrating an equivalent circuit of a light-up signal line taking the influence by the parasite resistances of the substrate into consideration in the case where the first exemplary embodiment is not employed.

FIG. 12A is a diagram illustrating an equivalent circuit of a light-up signal line taking the influence by the parasite resistances of the substrate 80 into consideration in the first exemplary embodiment. FIG. 12B is a diagram illustrating an equivalent circuit of a light-up signal line taking the influence by the parasite resistances of the substrate 80 into consideration in the case where the first exemplary embodiment is not employed.

As shown in a part surrounded with a dashed-dotted line in each of FIGS. 12A and 12B, the substrate 80 has a parasite resistance Rd between each adjacent two of the anode terminals of the light-emitting thyristors L, and a parasite resistance Rs between each anode terminal and the back-side common electrode provided on the back of the substrate 80.

Figure 13:
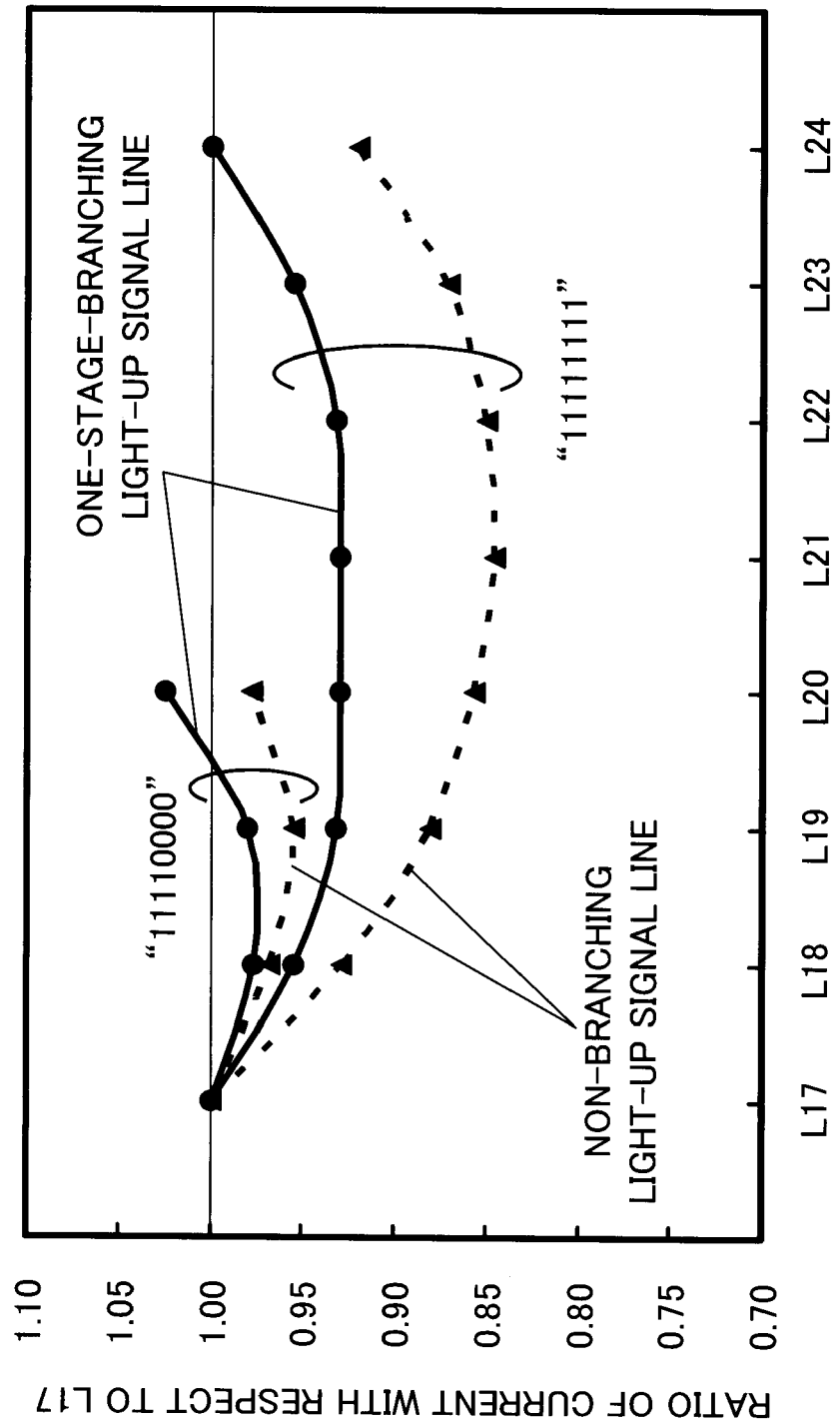
FIG. 13 is a graph illustrating currents flowing to the respective light-emitting thyristors in the case where the influence by the parasite resistances of the substrate is considered in the first exemplary embodiment.

FIG. 13 is a graph illustrating currents flowing to the respective light-emitting thyristors L in the case where the influence by the parasite resistances of the substrate 80 is considered in the first exemplary embodiment (the one-stage-branching light-up signal line). The horizontal axis in FIG. 13 indicates the light-emitting thyristor L numbers. Here, the light-emitting thyristors L17 to L24 in the block #C are caused to light up simultaneously. The vertical axis in FIG. 13 indicates ratios of currents flowing to the respective light-emitting thyristors L17 to L24 to a current flowing to the light-emitting thyristor L17. Note that FIG. 13 also shows the case where the first exemplary embodiment is not employed (the non-branching light-up signal line).

FIG. 13 shows a case in which "11111111" and "11110000" are given as image data. In other words, when the image data is "11111111," all of the light-emitting thyristors L17 to L24 are lighted. On the other hand, when the image data is "11110000," the light-emitting thyristors L17 to L20 are lighted while the light-emitting thyristors L21 to L24 remain to be put out.

First, a description will be given of a case where the image data is "11111111" in the non-branching light-up signal line 75.

In the case described above where the parasite-resistance influence of the substrate 80 is negligible, a current flowing to the light-emitting thyristor L decreases as the light-emitting thyristor L number increases, as shown in FIG. 11. On the other hand, as shown in FIG. 13, a current flowing to the light-emitting thyristor L tends to decrease as the light-emitting thyristor number increases from L17 to L21, but conversely tends to increase as the light-emitting thyristor number increases from L21 to L24. In this way, a current distribution among the plural light-emitting thyristors L caused to light up simultaneously tends to form a shape of a letter U.

A conceivable reason why the current distribution forms a U shape is as follows.

A current flowing to the light-emitting thyristor L takes a path of the back-side common electrode, the parasite resistances Rs, Rd of the substrate 80, and then the light-emitting thyristor L. Thereafter, after passing through the parasite resistance Rp of the light-emitting thyristor L, the current travels to the light-up signal line 75. Then, the current flows to the φI terminal after passing through the parasite resistances Ral, Rw, Rb of the light-up signal line 75.

When the plural light-emitting thyristors L arranged adjacently are in the ON state, a density of currents flowing in the substrate 80 at a center part of the array of the light-emitting thyristors L in the ON state is higher than that of currents flowing in the substrate 80 at a peripheral part thereof. For this reason, a potential drop due to the parasite resistances of the substrate 80 is observed more in the center part than in the peripheral part. In other words, the center part is in a state as if the parasite resistances of the substrate 80 are large. Therefore, currents flowing to the light-emitting thyristors L at the center part are thought to be small (to be a U shape).

The light-emitting thyristor L21 receives a smallest current, and is located shifted from the center to a slightly larger number. This is because the following two influences overlap: the influence by the parasite resistances of the light-up signal line 75 (tendency to be a downward slope to the right) in which a current flowing to the light-emitting thyristor L decreases as the light-emitting thyristor L number increases, in the non-branching light-up signal line 75 shown in FIG. 11; and the influence by the parasite resistances of the substrate 80 mentioned above (tendency to be a U shape). For this reason, the position of the light-emitting thyristor L receiving a smallest current is shifted from the center to a slightly larger number.

There is a 15% difference in current (the width of the current distribution) between the light-emitting thyristor L17 receiving a largest current and the light-emitting thyristor L21 receiving a smallest current.

On the other hand, in the case of the one-stage-branching light-up signal line 75 of the first exemplary embodiment shown in FIGS. 9A and 9B, the difference in current (the width of the current distribution) is 7%. This is because the above-mentioned influence by the parasite resistances of the one-stage-branching light-up signal line 75 (tendency to be a Λ shape) and the above-mentioned influence by the parasite resistances of the substrate 80 (tendency to be a U shape) overlap and cancel out (compensate for) each other.

For the reasons above stated, in the one-stage-branching light-up signal line 75 of the first exemplary embodiment, the width of the current distribution is ½ of that in the non-branching light-up signal line 75.

In the non-branching light-up signal line 75, when image data is "11110000," a smallest current flows to the light-emitting thyristor L19, which is located shifted from the center toward a slightly larger number, among the light-emitting thyristors L17 to L20 caused to light up simultaneously. This tendency also applies to a case of image data "11111111." Since the light-up signal line 75 has no branching as is appreciated from FIG. 12B, there is no difference in tendency between simultaneous light-up of eight points and simultaneous lighting of four points.

By contrast, in the one-stage-branching light-up signal line 75, a current received by the light-emitting thyristor L20 is larger than that received by the light-emitting thyristor L17. A conceivable reason for this is as follows. Specifically, the influence by the parasite resistances of the substrate 80 brings about a tendency that the current distribution forms a U shape in which a current flowing to the light-emitting thyristor L18 or L19 is the smallest. In other words, in the current distribution having a U shape due to the parasite resistances of the substrate 80, an axis of symmetry is the barycenter of the array of "1"s.

On the other hand, the influence by the parasite resistances of the light-up signal line 75 brings about a tendency that the current distribution has an increase in value from the light-emitting thyristor L17 to the light-emitting thyristor L20, as shown in FIG. 11. In other words, in the current distribution having a Λ shape due to the parasite resistances of the light-up signal line 75, the axis of symmetry is at the connection point S provided to each of the block wirings 75A, 75B . . . at a midpoint thereof.

Hence, it is thought that, having different positions of axes of symmetry, the influence by the parasite resistances of the substrate 80 (tendency to be a U shape) and the influence by the parasite resistances of the one-stage-branching light-up signal line 75 (tendency to be a Λ shape) are unable to cancel out (compensate for) each other, causing the light-emitting thyristor L20 to receive strongly the influence by the parasite resistances of the substrate 80 (tendency to be a U shape).

In this way, depending on the image data, the difference in current is observed more in the one-stage-branching light-up signal line 75 than in the non-branching light-up signal line 75.

However, in considering an influence on the quality of an image formed by the image forming apparatus 1, it is sufficient to compare one of all the image-data combinations, which has the largest current distribution.

In the non-branching light-up signal line 75, the current distribution has the largest width when the image data is "11111111." There is a 15% difference in current between the light-emitting thyristor L17 receiving the largest current and the light-emitting thyristor L21 receiving the smallest current.

In the one-stage-branching light-up signal line 75, on the other hand, the current distribution is thought to have the largest width when the image data is either "11111111," "11110000," or "00001111."

The reason is as follows. Note that only one of "11110000" and "00001111" needs to be considered here because a block wiring (the block wiring 75C in the block #C) has a symmetric structure with respect to the connection point S (one-stage branching point).

(1) The axis of symmetry of the current distribution having a U shape due to the influence by the parasite resistances of the substrate 80 passes through the barycenter of the array of "1"s, and the axis of symmetry of the current distribution having a Λ shape due to the influence by the parasite resistances of the light-up signal line 75 passes through the connection point S of one-stage branching.

(2) In the case of "11111111," the current distribution is affected most strongly by the parasite resistances of the substrate 80 and forms a U shape accordingly. However, since the U-shaped current distribution and the Λ-shaped current distribution coincide with each other in terms of the axis of symmetry, there is a maximum compensation effect.

(3) In the case of "11110000," the axis of symmetry of the U-shaped current distribution is placed between the light-emitting thyristor L18 and the light-emitting thyristor L19, and is therefore shifted from the axis of symmetry of the Λ-shaped current distribution, which is placed between the light-emitting thyristor L20 and the light-emitting thyristor L21. Accordingly, there is a small compensation effect, so that the influence by the parasite resistances of the light-up signal line 75 is maximum and exhibits a great effect.

By the reasons described above, a smallest current-distribution width may be obtained by selecting parasite resistances of the light-up signal line 75 as follows. Specifically, the parasite resistances to be selected are ones that cause the width of the current distribution obtained for image data of "11111111" to be the same as that obtained for image data of "11110000," with the parasite resistance of the substrate 80 being fixed.

In the example case described above, eight light-emitting points (light-emitting thyristors L) are handled as a block, and electric power is supplied from the center (barycenter) of the block having one-stage branching. However, the number of light-emitting points is not limited. Specifically, the parasite resistances of the light-up signal line 75 may be selected so that a first difference (current-distribution width) may be equal to a second difference (current-distribution width), the first difference being a difference between the largest value and the smallest value of currents flowing to the respective light-emitting thyristors L when all the light-emitting points in a block are lighted up simultaneously, the second difference being a difference between the largest value and the smallest value of currents flowing to the respective light-emitting thyristors L when only the light-emitting points included from one end or the other end to the center of a block (the light-emitting points in a first half (right half) or a second half (left half)) are all lighted up. Note that, when the number of light-emitting points belonging to one block is an odd number, both of the first half (right half) or the second half (left half) may include the center light-emitting point. Note that the difference between the first difference and the second difference does not necessarily have to be 0, but only has to be small according to the image quality.

Second Exemplary Embodiment

Figure 14:
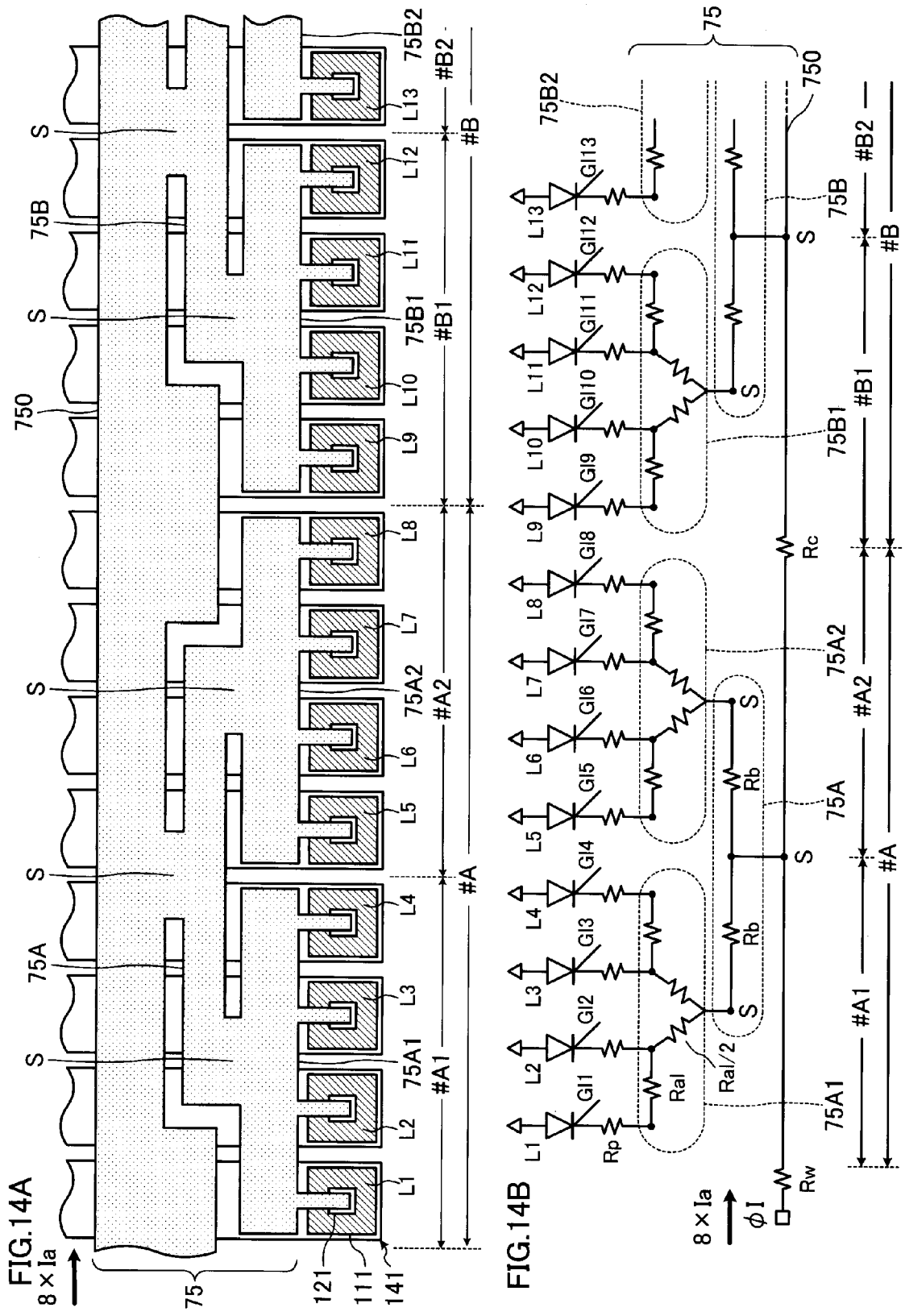
FIG. 14A is a planar layout of a light-up signal line of the second exemplary embodiment.
FIG. 14B is a diagram illustrating an equivalent circuit of the light-up signal line shown in FIG. 14A.

FIG. 14A is a planar layout of a light-up signal line 75 of the second exemplary embodiment. FIG. 14B is a diagram illustrating an equivalent circuit of the light-up signal line 75 shown in FIG. 14A. Portions similar to those in the first exemplary embodiment are denoted by the same reference numerals as those, and a detailed description thereof will be omitted.

In the second exemplary embodiment, the light-emitting thyristors L1 to L8 belonging to a block #A are divided into the light-emitting thyristors L1 to L4 belonging to a sub-block #A1 and the light-emitting thyristors L5 to L8 belonging to a sub-block #A2. The same applied to blocks #B, #C....

The light-up signal line 75 includes a main wiring 750, sub-block wirings 75A1, 75A2, 75B1, 75B2 . . . , and block wirings 75A, 75B . . . that connect the main wiring 750 with the sub-block wirings 75A1, 75A2, 75B1, 75B2 . . . .

The cathode terminals of the light-emitting thyristors L1 to L4 belonging to the sub-block #A1 are connected to the sub-block wiring 75A1, and the cathode terminals of the light-emitting thyristors L5 to L8 belonging to the sub-block #A2 are connected to the sub-block wiring 75A2. Each of the sub-block wirings 75A1 and 75A2 is connected to the block wiring 75A at the connection point S provided at a midpoint thereof.

The same applies to the sub-block #B1, #B2 . . . .

Further, each of the block wirings 75A, 75B . . . is connected to the main wiring 750 at the connection point S provided at a midpoint thereof.

In other words, the light-up signal line 75 has a tree structure having the main wiring 750 as a trunk, the block wirings 75A, 75B . . . as branches, and further the sub-block wirings 75A1, 75A2, 75B1, 75B2 . . . as branches.

The light-up signal line 75 shown in FIG. 14A has two stages of branching and therefore is called a two-stage-branching light-up signal line 75 herein.

The light-up signal line 75 shown in FIG. 14A is represented as the equivalent circuit shown in FIG. 14B. For example, in such an approximate circuit, the main wiring 750 has a parasite resistance Rw near the φI terminal and has a parasite resistance Rc between the block wiring 75A and the block wiring 75B. In the approximate circuit, the block wiring 75A has a parasite resistance Rb between the sub-block wiring 75A1 and the main wiring 750 as well as between the sub-block wiring 75A2 and the main wiring 750. The same applies to the block wirings 75B . . . . In the approximate circuit, the sub-block wiring 75A1 has a parasite resistance Ral between each adjacent two of the light-emitting thyristors L. Accordingly, the light-emitting thyristors L and the light-up signal line 75 that supplies light-up signals may be approximated as a distributed constant circuit (FIG. 14B) formed by a distribution of the parasite resistances Rw, Rb, Rc, Rp, and Ral.

As is appreciated from FIG. 14B, in the second exemplary embodiment, the difference, among the light-emitting thyristors L, in the value of a resistance of the line from the anode terminal of the light-emitting thyristor L to the φI terminal is smaller than that in the first exemplary embodiment described above.

Figure 15:
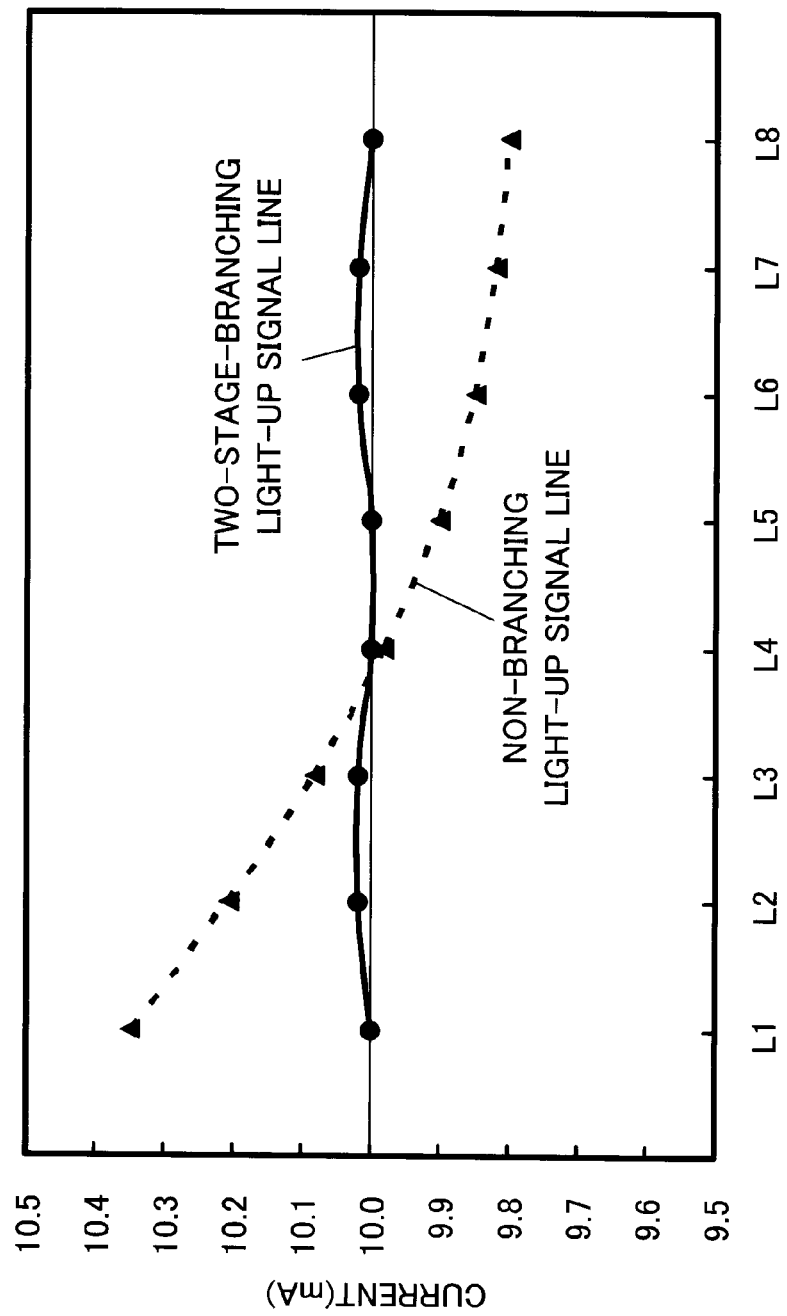
FIG. 15 is a graph illustrating currents flowing to the respective light-emitting thyristors in the second exemplary embodiment.

FIG. 15 is a graph illustrating currents flowing to the respective light-emitting thyristors L in the second exemplary embodiment (the two-stage-branching light-up signal line 75). The horizontal axis in FIG. 15 indicates the light-emitting thyristor L numbers. Here, the light-emitting thyristors L1 to L8 in the block #A are caused to light up simultaneously. The vertical axis in FIG. 15 indicates the values of the currents flowing to the respective light-emitting thyristors L1 to L8. Note that FIG. 15 also shows the case where the second exemplary embodiment is not employed (a non-branching light-up signal line).

The values are obtained in the same way as the case in FIG. 11 in the first exemplary embodiment, assuming that there is no influence by the parasite resistances of the substrate 80 and the like.

In the two-stage-branching light-up signal line 75 of the second exemplary embodiment, each of the light-emitting thyristors L1 and L4 positioned at both ends of the sub-block #A1 receives a smaller current than the light-emitting thyristors L2 and L3 positioned at the center of the sub-block #A1. The same applies to the sub-block #A2. The two-stage-branching light-up signal line 75 has a 0.2% difference in current (the width of the current distribution) among the light-emitting thyristors L in one block. This is 1/30 of that of the non-branching light-up signal line 75. Thus, a variation in light amount among the light-emitting thyristors L in one block may be reduced.

In the second exemplary embodiment, four light-emitting thyristors L belong to each of the sub-blocks #A1, #A2 . . . . Further, each of the sub-blocks may be divided into two blocks each having two light-emitting thyristors L. In this case, the light-up signal line 75 has three stages of branching, and is therefore a three-stage-branching light-up signal line 75.

In such three-stage-branching light-up signal line 75, the difference in current (the width of the current distribution) observed among the light-emitting thyristors L by lighting up all of the light-emitting thyristors L1 to L8 in the block #A is almost the same as that observed in the case where the light-emitting thyristors L are caused to light up individually.

In the second exemplary embodiment, all of the blocks are divided into sub-blocks; however, only part of the blocks may be divided into sub-blocks. In addition, the number of light-emitting thyristors L belonging to one sub-block may be different from one sub-block to another. Note that, when the number of light-emitting thyristors L belonging to one sub-block is an even number, the difference, among the light-emitting thyristors L in the block, in currents flowing to the respective light-emitting thyristors L is smaller than that obtained when the number is an odd number.

It may be thought that the influence by the parasite resistances of the substrate 80 is similar to that in the first exemplary embodiment.

Third Exemplary Embodiment

Figure 16:
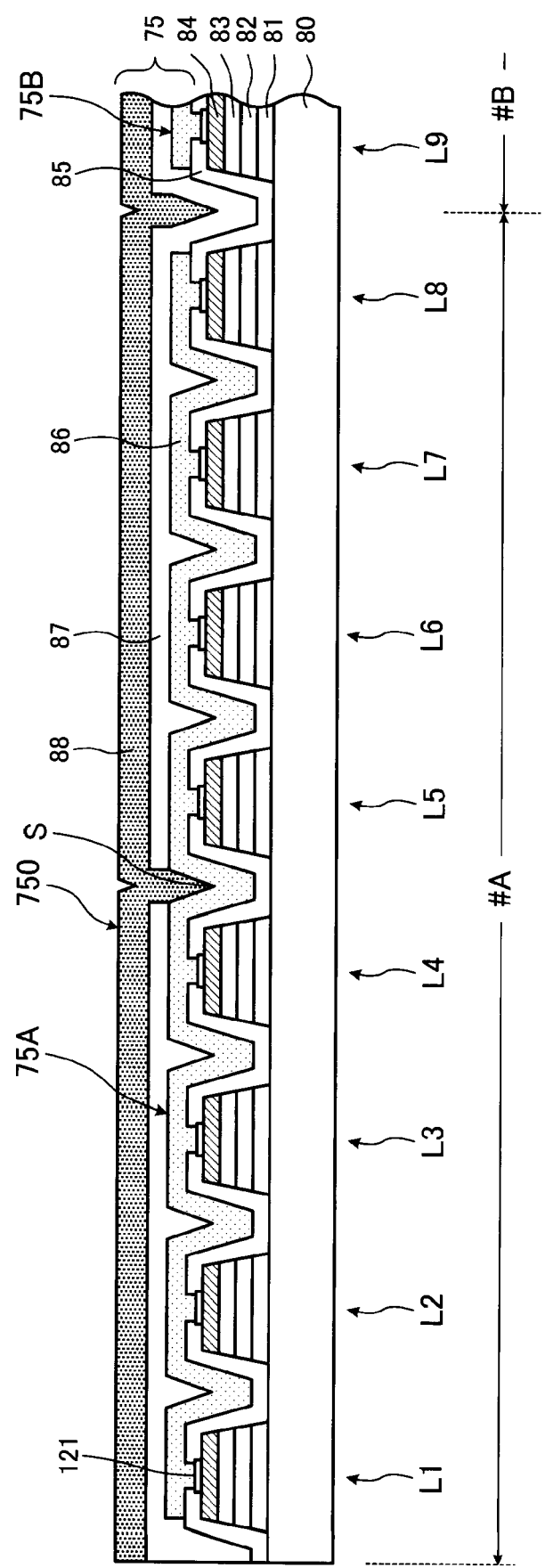
FIG. 16 is a cross-sectional view of a light-up signal line of the third exemplary embodiment.

FIG. 16 is a cross-sectional view of a light-up signal line 75 of the third exemplary embodiment.

In the third exemplary embodiment, the wiring layer of the two-stage-branching light-up signal line 75 shown in FIGS. 9A and 9B is formed as multi-layers. Note that the two-stage-branching light-up signal line 75 in FIG. 9A is configured in a planar layout.

Portions similar to those in FIGS. 6B, 9A and 9B are denoted by the same reference numerals as those, and a detailed description thereof will be omitted.

In FIG. 16, there is provided a first insulating layer 85 that has openings for n-type ohmic electrodes of the respective light-emitting thyristors L1 to L9 (for example, an n-type ohmic electrode 121 for the light-emitting thyristor L1). Then, a first wiring layer 86 is formed on the first insulating layer 85, a second insulating layer 87 on the first wiring layer 86, and a second wiring layer 88 on the second insulating layer 87.

In other words, the first wiring layer 86 and the second wiring layer 88 are formed as multi-layers sandwiching the second insulating layer 87.

The first wiring layer 86 connecting the cathode terminals of the light-emitting thyristors L1 to L8 constitutes a block wiring 75A. Then, the block wiring 75A is connected to a main wiring 750 that the second wiring layer 88 constitutes, at a connection point S (opening) provided in a midpoint between the light-emitting thyristors L4 and L5.

In this way, the branching light-up signal line 75 may be formed by using plural wiring layers. Note that, to form the two-stage-branching light-up signal line 75 described in the second exemplary embodiment, as a multi-layer wiring, a structure having three layers may be employed, in which the sub-block wirings 75A1, 75A2 . . . , the block wirings 75A, 75B . . . , and the main wiring 750 are assigned to the respective layers.

Alternatively, two wiring layers may be provided, in which any two groups of the sub-block wirings 75A1, 75A2 . . . , the block wirings 75A, 75B . . . , and the main wiring 750 are assigned to one of the two wiring layers, and the rest is assigned to the other one of the wiring layers.

In the first and the third exemplary embodiment, each of the block wirings 75A, 75B . . . is connected to the main wiring 750 at the connection point S provided in a midpoint thereof. However, the connection point S does not necessarily have to be located in the midpoint, but may be provided anywhere as long as the difference in current (light amount) among the light-emitting thyristors L in a block falls within a predetermined range. Accordingly, the connection point S need not be provided at a midpoint of each of the block wirings 75A, 75B . . . , and the position of the connection point S may be changed depending on the layout of the main wiring 750 and the block wirings 75A, 75B . . . .

The same applies to the sub-block wirings in the second exemplary embodiment.

Moreover, although one block includes eight light-emitting thyristors L in the first to third exemplary embodiments, the number of the light-emitting thyristors L is not limited to eight. One block may include more than eight light-emitting thyristors L or less than eight light-emitting thyristors L. Further, the number of the light-emitting thyristors L belonging to one block may be different from one block to another.

Furthermore, although power supply to the light-emitting thyristors L employs current driving in the first to third exemplary embodiments, voltage driving may be employed instead. In this case, a resistance may be provided between the cathode terminal of the light-emitting thyristor L and the light-up signal line 75.

In the first to third exemplary embodiments, descriptions have been given assuming the self-scanning light-emitting device array (SLED) shown in FIG. 5. However, it is clearly possible to employ a self-scanning light-emitting device array (SLED) of a different configuration capable of causing plural light-emitting thyristors L to light up simultaneously.

In the first to third exemplary embodiments, the first p-type semiconductor layer 81, the second n-type semiconductor layer 82, the third p-type semiconductor layer 83 and the fourth n-type semiconductor layer 84 are sequentially stacked on the substrate 80 as the p-type semiconductor. However, the first p-type semiconductor layer 81 may be omitted by causing the substrate 80 that is the p-type semiconductor to also function as the first p-type semiconductor layer 81.

Alternatively, a cathode-common thyristor configured by sequentially stacking an n-type semiconductor layer, a p-type semiconductor layer, an n-type semiconductor layer and a p-type semiconductor layer on the substrate that is an n-type semiconductor may be used.

Note that, the usage of the light-emitting device in the present invention is not limited to an exposure device used in an electrophotographic image forming unit. The light-emitting device in the present invention may be also used in optical writing other than the electrophotographic recording, displaying, illumination, optical communication and the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A light-emitting device comprising:
a plurality of light-emitting elements arrayed in line; and
a light-up signal wiring including block wirings that connect the plurality of light-emitting elements divided into a plurality of blocks being units for controlling turning on and off of the light-emitting elements, and that supply electric power for light emission to the light-emitting elements belonging to each of the blocks, and a main wiring that extends from a feeding point and to which the block wirings are connected;
a resistance distribution in the light-up signal wiring being set so that a difference between a first difference and a second difference is small, the first difference being a difference between a largest value and a smallest value of currents flowing to the light-emitting elements being lighted up when all the light-emitting elements belonging to one of the blocks are lighted up, the second difference being a difference between a largest value and a smallest value of currents flowing to the light-emitting elements being lighted up when the light-emitting elements included from any one of both ends to a center of the one of the blocks are lighted up.

2. The light-emitting device according to claim 1, wherein the number of the light-emitting elements belonging to each of the blocks is an even number.

3. The light-emitting device according to claim 1, wherein, each of the block wirings that connects the light-emitting elements belonging to one of the blocks is provided with a connection point to the main wiring at a midpoint of the each of the block wirings that connects the light-emitting elements positioned at both ends belonging to the one of the blocks.

4. The light-emitting device according to claim 1, wherein the block wirings and the main wiring of the light-up signal wiring are formed so as to have a multi-layer wiring structure including different wiring layers.

5. The light-emitting device according to claim 1, wherein in at least one of the blocks, the plurality of light-emitting elements forming the one of the blocks are divided into a plurality of sub-blocks,
each sub-block forming the plurality of sub-blocks includes a sub-block wiring that connects the light-emitting elements belonging to the sub-block and that supplies electric power for light emission, and
each sub-block wiring of the plurality of sub-blocks is sequentially concentrated in a tree structure to be connected to the main wiring.

6. The light-emitting device according to claim 5, wherein the number of the light-emitting elements belonging to each of the sub-blocks is an even number.

7. The light-emitting device according to claim 5, wherein each sub-block wiring that connects the light-emitting elements belonging to each sub-block is provided with a connection point at a midpoint of the each sub-block wiring that connects the light-emitting elements positioned at both ends belonging to the each sub-block, and is concentrated in the tree structure from the connection point.

8. The light-emitting device according to claim 5, wherein each sub-block wiring of the sub-blocks, a wiring concentrating each sub-block wiring in the tree structure, and the main wiring are formed so as to have a multi-layer wiring structure.

9. The light-emitting device according to claim 5, wherein a resistance distribution in the light-up signal wiring is set so that a difference between a first difference and a second difference is small, the first difference being a difference between a largest value and a smallest value of currents flowing to the light-emitting elements being lighted up when all the light-emitting elements belonging to one of the sub-blocks are lighted up, the second difference being a difference between a largest value and a smallest value of currents flowing to the light-emitting elements being lighted up when the light-emitting elements included from any one of both ends to a center of the one of the sub-blocks are lighted up.

10. A print head comprising:
an exposure unit that includes a light-emitting device and a light-up signal supplying unit and that exposes an image carrier; and
an optical unit that focuses light emitted by the exposure unit on the image carrier,
the light-emitting device including:
a plurality of light-emitting elements arrayed in line; and
a light-up signal wiring including block wirings that connect the plurality of light-emitting elements divided into a plurality of blocks being units for controlling turning on and off of the light-emitting elements, and that supply electric power for light emission to the light-emitting elements belonging to each of the blocks, and a main wiring that extends from a feeding point and to which the block wirings are connected,
a resistance distribution in the light-up signal wiring being set so that a difference between a first difference and a second difference is small, the first difference being a difference between a largest value and a smallest value of currents flowing to the light-emitting elements being lighted up when all the light-emitting elements belonging to one of the blocks are lighted up, the second difference being a difference between a largest value and a smallest value of currents flowing to the light-emitting elements being lighted up when the light-emitting elements included from any one of both ends to a center of the one of the blocks are lighted up, and
the light-up signal supplying unit transmitting a light-up signal to supply the electric power for light emission to the light-emitting elements belonging to each of the blocks.

11. The print head according to claim 10, wherein the light-up signal supplying unit of the exposure unit supplies the light-up signal by current driving.

12. An image forming apparatus comprising:
a charging unit that charges an image carrier;
an exposure unit that includes a light-emitting device and a light-up signal supplying unit and that exposes the image carrier to form an electrostatic latent image;
an optical unit that focuses light emitted by the exposure unit on the image carrier;
a developing unit that develops the electrostatic latent image formed on the image carrier; and
a transfer unit that transfers an image developed on the image carrier to a transferred body,
the light-emitting device including:
a plurality of light-emitting elements arrayed in line; and
a light-up signal wiring including block wirings that connect the plurality of light-emitting elements divided into a plurality of blocks being units for controlling turning on and off of the light-emitting elements, and that supply electric power for light emission to the light-emitting elements belonging to each of the blocks, and a main wiring that extends from a feeding point and to which the block wirings are connected,
a resistance distribution in the light-up signal wiring being set so that a difference between a first difference and a second difference is small, the first difference being a difference between a largest value and a smallest value of currents flowing to the light-emitting elements being lighted up when all the light-emitting elements belonging to one of the blocks are lighted up, the second difference being a difference between a largest value and a smallest value of currents flowing to the light-emitting elements being lighted up when the light-emitting elements included from any one of both ends to a center of the one of the blocks are lighted up, and the light-up signal supplying unit transmitting a light-up signal to supply the electric power for light emission to the light-emitting elements belonging to each of the blocks.

* * * * *